United States Patent [19]
DeFino

[11] Patent Number: 6,104,783
[45] Date of Patent: Aug. 15, 2000

[54] METHOD AND APPARATUS FOR SECURING A SITE UTILIZING A SECURITY APPARATUS IN COOPERATION WITH TELEPHONE SYSTEMS

[75] Inventor: John M. DeFino, Stroudsburg, Pa.

[73] Assignee: Instant Alert Security, LLC, Fort Worth, Tex.

[21] Appl. No.: 08/640,566

[22] Filed: May 1, 1996

[51] Int. Cl.[7] .................................................. H04M 11/04
[52] U.S. Cl. .................................. 379/38; 379/39; 379/45
[58] Field of Search .................................. 379/38, 39, 40, 379/41, 42, 43, 44, 45, 106.01; 340/531, 532, 539

[56] References Cited

U.S. PATENT DOCUMENTS

| | | | |
|---|---|---|---|
| 3,914,692 | 10/1975 | Seaborn, Jr. ............................. | 340/531 |
| 4,157,540 | 6/1979 | Oros ....................................... | 340/539 |
| 4,692,742 | 9/1987 | Raizen et al. ........................... | 340/539 |
| 4,760,593 | 7/1988 | Shapiro et al. .......................... | 379/38 |
| 4,855,713 | 8/1989 | Brunius .................................. | 340/506 |
| 4,884,060 | 11/1989 | Shapiro .................................. | 340/514 |
| 4,897,862 | 1/1990 | Nishihara et al. ....................... | 379/40 |
| 5,134,644 | 7/1992 | Garton et al. ........................... | 379/396 |
| 5,162,776 | 11/1992 | Bushnell et al. ........................ | 340/501 |
| 5,257,007 | 10/1993 | Steil et al. ............................... | 340/539 |
| 5,337,342 | 8/1994 | Kruger et al. ........................... | 379/40 |
| 5,365,217 | 11/1994 | Toner ...................................... | 340/531 |
| 5,416,466 | 5/1995 | Malvaso et al. ......................... | 340/539 |
| 5,714,931 | 2/1998 | Petite et al. ............................. | 340/539 |
| 5,729,197 | 3/1998 | Cash ....................................... | 379/41 |
| 5,745,849 | 4/1998 | Britton ................................... | 379/40 |

FOREIGN PATENT DOCUMENTS

| | | | |
|---|---|---|---|
| 405252459A | 9/1993 | Japan ............................. | H04N 5/455 |

*Primary Examiner*—Curtis A. Kuntz
*Assistant Examiner*—Melur Ramakrishnaiah
*Attorney, Agent, or Firm*—Felsman, Bradley, Vaden, Gunter & Dillon, L.L.P.

[57] ABSTRACT

A security system for a building uses the telephone system. Telephone receivers are located in various rooms in the building and linked through a telephone exchange. Persons that live or work in the building are provided with wireless alarm transmitters. Wireless receivers are located in the building, each coupled to one of the telephone receivers. Each wireless receiver, when receiving an alarm signal from one of the transmitters, initiates a call to the telephone exchange in response. The wireless receiver message will identify the individual associated with the particular transmitter and provide the location of the receiver that received the alarm signal.

2 Claims, 20 Drawing Sheets

SUPERVISORY DATA

| TYPE OF CALL | RECEIVER ID | TRANSMITTER ID | DATE | TIME |
|---|---|---|---|---|
| TEST CALL | 1234 | 6789 | 3-15-96 | 10:30 |
| CHECK-IN | 5678 | 1432 | 3-15-96 | 10:50 |
| TEST CALL | 4321 | 2441 | 3-15-96 | 10:55 |
| CHECK-IN | 2345 | 4444 | 3-15-96 | 11:00 |

EMERGENCY AND ASSIST CALLS

| TYPE OF CALL | RECEIVER ID | TRANSMITTER ID | DATE | TIME |
|---|---|---|---|---|
| ASSIST | 1234 | 1111 | 3-15-96 | 8:05 |
| ASSIST | 4321 | 1234 | 3-15-96 | 8:30 |
| ASSIST | 2211 | 4444 | 3-15-96 | 8:45 |
| EMERGENCY | 3121 | 3232 | 3-15-96 | 10:00 |

FIG. 17

METHOD AND APPARATUS FOR SECURING A SITE UTILIZING A SECURITY APPARATUS IN COOPERATION WITH TELEPHONE SYSTEMS

BACKGROUND OF THE INVENTION

1. Field of the Invention

The present invention relates in general to security systems and, in particular, to security systems which may be utilized to secure a site which includes one or more telephone systems located therein. The invention utilizes equipment which works in combination with the telephone system to communicate security information within the secured site.

2. Description of the Prior Art

Recent technological advances have enabled ordinary citizens and consumers to expect and receive greater security for their lives and property. For example, many automotive manufacturers now include security systems as a basic component of their automotive products. The security system prevents theft of, or damage to, the vehicle and may secondarily serve to provide security for the owner of the vehicle in the event of assault in the immediate vicinity of his/her vehicle. This is accomplished through use of "panic buttons" which may set off the alarm to deter an attacker or to summon assistance from bystanders or those passing by. Also, security systems are commonly installed in houses in order to deter theft of items in the house or unlawful entry into the house. Furthermore, such alarm systems typically include one or more "panic buttons" which allow the owner or resident to summon assistance from a monitoring service and/or local law enforcement agencies.

As a consequence, citizens expect greater security in their public, as well as private, spaces. For example, many consumers expect shopping malls and other large shopping areas to provide security in and around the shopping center or mall.

The present invention is directed to a security system which enhances the security of persons and property in either public or private secured sites, and is especially useful in large public facilities, such as college campuses, hospitals, shopping malls, apartment complexes, office and industrial parks, and office buildings.

SUMMARY OF THE INVENTION

It is one objective of the present invention to provide a security apparatus which may be used in at least one structure which includes a plurality of rooms and which further includes a telephone system located therein, wherein a plurality of receivers are located throughout the secured site within particular ones of the rooms in accordance with a receiver distribution schema, with each of the plurality of receivers being electrically coupled to a particular telephone and/or the associated telephone lines, and which is adapted to automatically initiate at least one telephone communication within the telephone system in response to detection of a wireless alarm signal which may be initiated by actuation of one of a number of portable transmitters.

It is another objective of the present invention to provide such security apparatus with means for interacting with a data processing system within a security office which communicates useful information to the security staff to allow for a quick and intelligent response to an alarm condition.

It is another objective of the present invention to provide the security apparatus with additional functionalities, such as an assistance request mode of operation wherein the portable transmitters may be utilized to request assistance from the security and/or other secured site staff for non-emergency conditions.

These and other objectives are achieved as now described. When characterized as an apparatus, the present invention is directed to a security apparatus which includes a number of components which cooperate together. The security apparatus may be utilized in at least one structure with a plurality of rooms defined therein. The structure and associated grounds may constitute a "secured site". A telephone exchange system is located within the one or more structures of the secured site. The telephone exchange system has a plurality of telephones distributed throughout the plurality of rooms. Furthermore, the telephone lines link together the telephone exchange. A plurality of portable transmitters are provided, which are issued to a plurality of system-authorized individuals in accordance with a transmitter-issuance schema, which identifies particular ones of the plurality of system-authorized individuals to particular transmitters, and which may be utilized to transmit a wireless alarm signal in response to actuation of an alarm condition switch contained on each of the plurality of portable transmitters. The security apparatus further includes a plurality of receivers which are located within the secured site within particular ones of the plurality of rooms in accordance with a receiver-distribution schema. Each of the plurality of receivers is electrically coupled to a particular one of the plurality of telephones and the telephone lines. Each one of the plurality of receivers may automatically initiate at least one telephone communication with the telephone exchange system in response to detection of a wireless alarm signal which may be generated by actuation of any one of the plurality of portable transmitters. Preferably, the communication generated by the plurality of receivers includes (a) identifying data which identifies a particular one of the plurality of portable transmitters which is associated with a particular one of the plurality of system-authorized individuals, and (b) locating information which identifies at least one of the plurality of receivers which have detected the wireless alarm signal. The information pertaining to the identify of the system-authorized individual and the location of the alarm condition may be utilized by security personnel in a response to the alarm condition.

BRIEF DESCRIPTION OF THE DRAWING

FIG. 17 is a pictorial representation of a monitoring system which logs all communications.

DETAILED DESCRIPTION OF THE INVENTION

Figure 1:
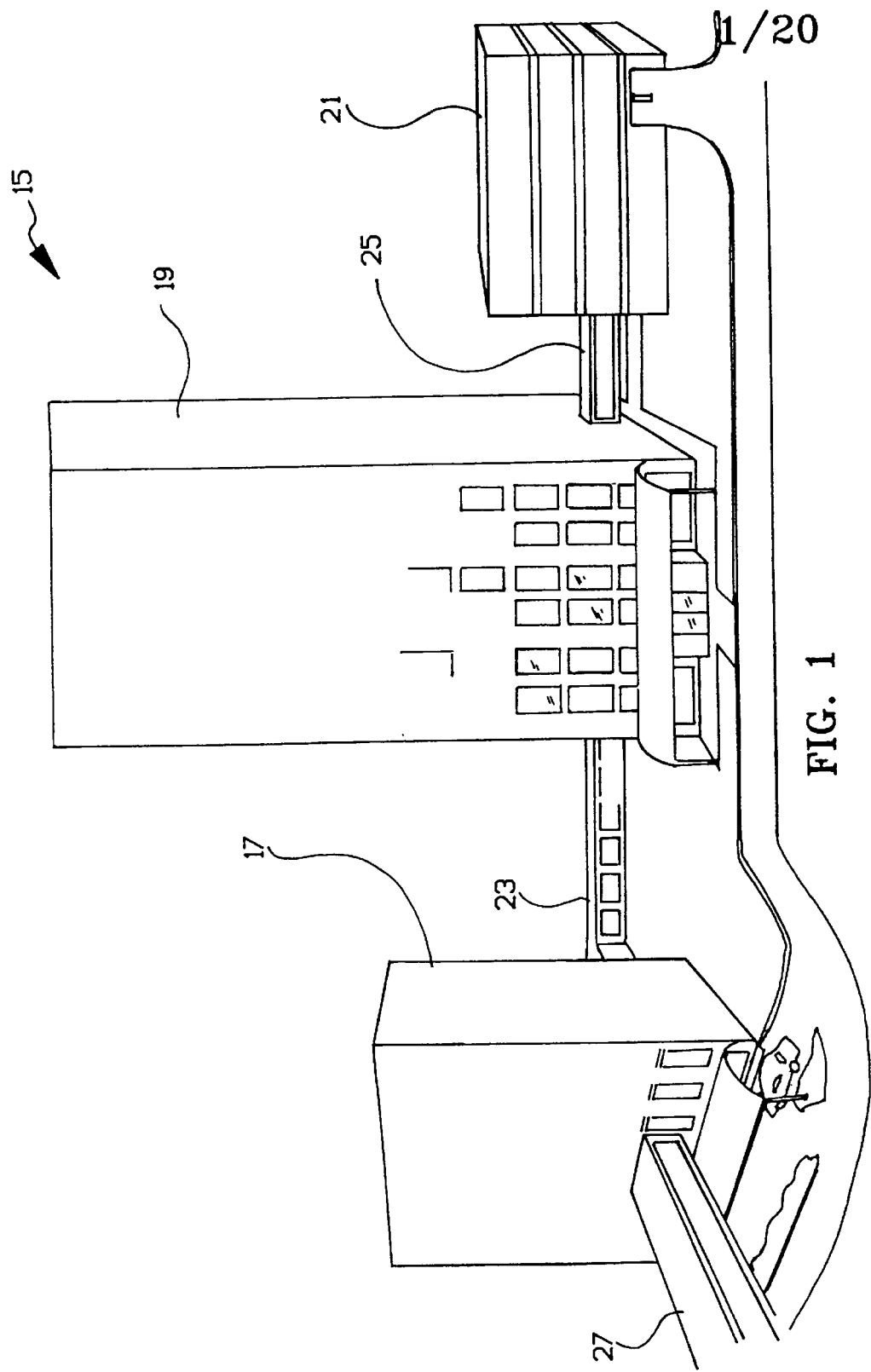
FIG. 1 is a perspective view of a secured site which includes numerous buildings and public spaces.

FIG. 1 is a pictorial representation of an exemplary site 15 which may be secured, utilizing the security apparatus 11 (not depicted) in accordance with the present invention. The secured site may include a variety of structures, such as hotel 17, office building 19, and parking garage 21. A plurality of walkways 23, 25, and 27 connect the structures to one another or to other sites. Each structure includes one or more telephone exchange systems located therein. For example, hotel 17 includes a telephone exchange system which allows for telephone communication within the rooms and facilities of hotel 17 and also with the outside world. Likewise, numerous offices may be located within office building 19, each of which may have a telephone exchange system which allows for intra-office communication, as well as communication with the outside world.

Figure 2:
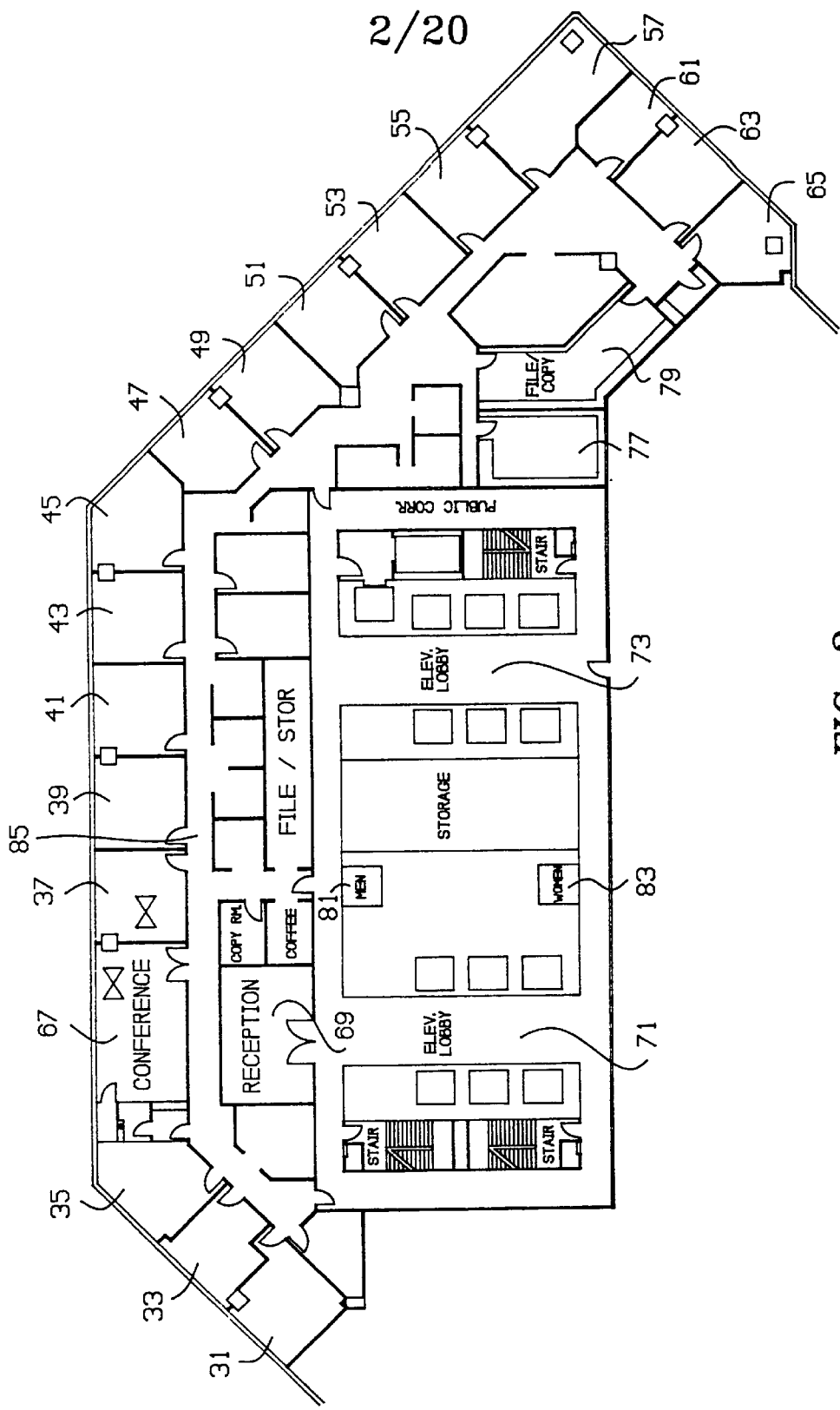
FIG. 2 is an example of an office space which may utilize the security apparatus of the present invention.

FIG. 2 is a pictorial and schematic representation of a portion of the space within either hotel 17 or office building 19. As can be seen, a plurality of private rooms 31, 33, 35, 37, 39, 41, 43, 45, 47, 49, 51, 53, 55, 57, 61, 63, and 65 are provided therein. Additionally, a plurality of public spaces may also be provided therein, such as conference room 67, reception area 69, elevator lobby 71, 73, meeting room 77, restrooms 81, 83, and hallway 85. The security apparatus 11 of the present invention cooperates with the existing telephone exchange system which is located within the space of FIG. 2. In accordance with the present invention, a plurality of portable transmitters are issued to those individuals making either temporary or permanent use of a particular room or rooms within the space of FIG. 2. For example, if FIG. 2 is representative of a hotel, the transmitters may be issued to guests of the hotel. In contrast, if FIG. 2 is representative of an office space, then the portable transmitters are issued to the workers which more or less permanently occupy and use the private and public rooms within the space of FIG. 2. The persons who make temporary or permanent use of the space are identified as "system-authorized individuals". The portable transmitters are issued to these system-authorized individuals in accordance with the transmitter issuance schema which identifies particular ones of the plurality of system-authorized individuals to particular transmitters, as will be discussed in greater detail below. In accordance with the present invention, a plurality of receivers are located within the secured site, and electrically coupled between the telephone units of the telephone exchange system and the telephone lines of the telephone exchange system. In accordance with the present invention, when a particular system-authorized individual is in need of emergency assistance, he/she may depress one or more buttons on his/her portable transmitter in order to generate a wireless alarm signal, which is preferably a radio frequency signal. The wireless alarm signal is detected by one or more of the receivers which are connected to the telephones and the telephone wiring. In accordance with the present invention, the receiver automatically initiates at least one telephone communication within the telephone exchange system in response to detection of the wireless alarm signal. In accordance with the present invention, the telephone communication preferably includes at least (1) identifying data which identifies the particular portable transmitter which has been actuated and (inferentially) the particular system-authorized individual associated with that transmitter, and (2) locating information which identifies the location of detection of the alarm signal. This information concerning the identity of the system-authorized individual who actuated the alarm condition and the location of detection of the alarm signal greatly facilitates the security personnel in making a response to the emergency situation. In accordance with the present invention, either a telephone communication reception apparatus or a data processing system may be utilized to receive the telephone communication and to retrieve the identifying information for display and use by security personnel.

Figure 3:
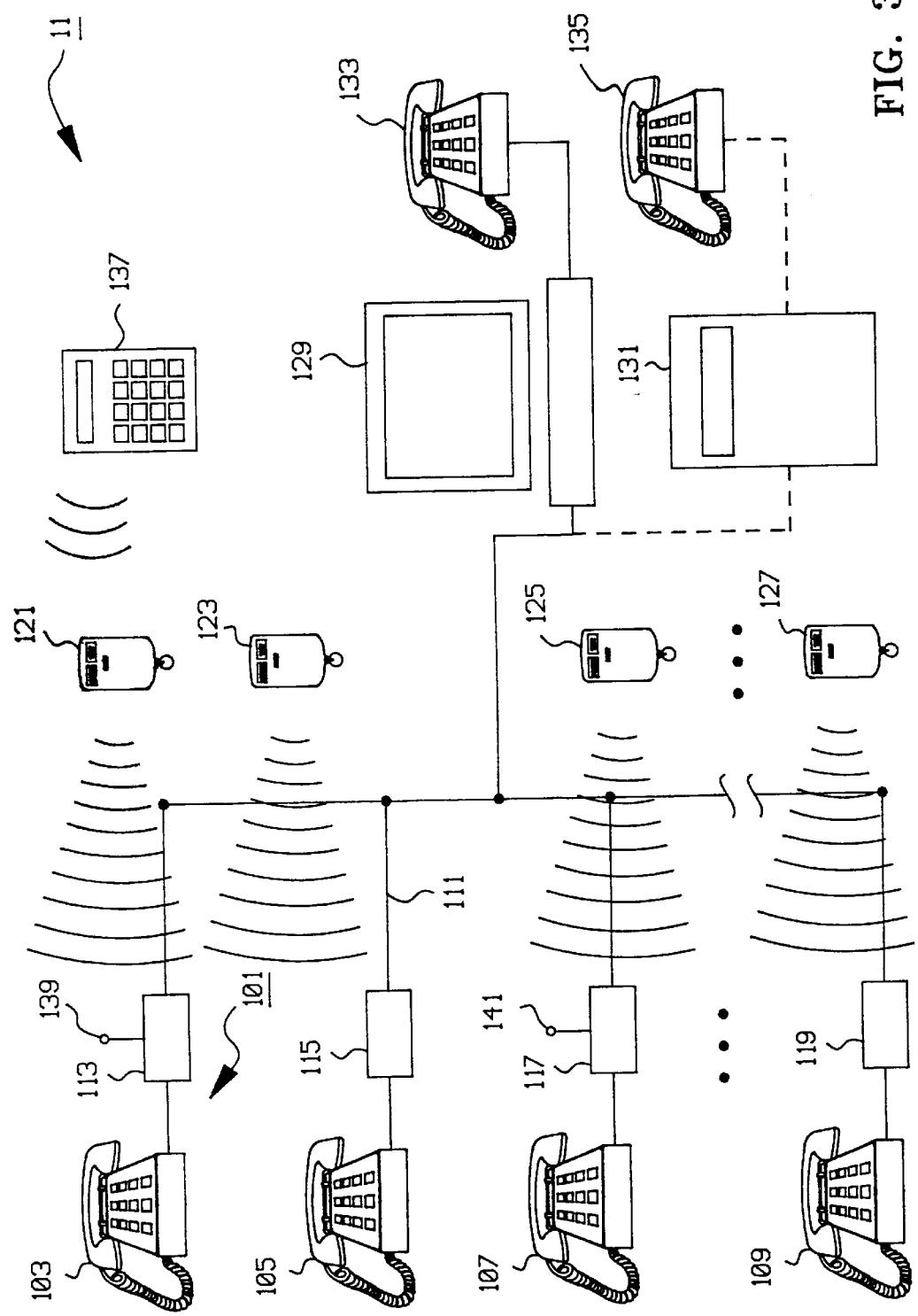
FIG. 3 is a schematic depiction of the security apparatus of the present invention.

The security apparatus 11 of the present invention will now be discussed in detail with reference first to FIG. 3. Security apparatus 11 is depicted in schematic and block diagram form in FIG. 3. As is shown, a telephone exchange system is provided which includes a plurality of telephones, such as telephones 103, 105, 107, and 109. These telephones are connected by lines 111 through an exchange to security system telephone, such as telephones 133, 135. In accordance with the present invention, a plurality of portable transmitters 121, 123, 125, and 127 are distributed to system-authorized individuals. Additionally, a plurality of receivers 103, 105, 107, 109 are electrically connected within the telephone exchange system to the telephones and wiring 111. In accordance with the present invention, the portable transmitters 121, 123, 125, and 127 include one or more buttons which may be depressed by the system-authorized individual in order to generate one or more wireless signals which may be received by receivers 113, 115, 117, and 119. Preferably, the signals are multi-bit radio frequency signals. When a receiver detects a radio frequency signal, it examines it in order to determine whether it is a valid signal. If so, receiver 113, 115, 117, 119, or any other receiver within the range of the portable transmitter, initiates a telephonic communication (preferably composed of DTMF signals) through the exchange to either a data processing system 129, which is appropriately programmed in order to receive and interpret the telephone communication, or to a controller 131, with an LCD display, which is also appropriately programmed to receive and interpret the telephonic communication. In accordance with the present invention, receivers 113, 115, 117, and 119 may be programmed by wireless communications from programming unit 137, which includes a numeric keypad for user interaction and an LCD display for displaying queries which prompts the user through the programming process and which displays information relating to the operating condition or programmed state of the particular receiver. Furthermore, and in accordance with the present invention, particular ones of the receivers may be equipped with manually-actuable "panic buttons" 139, 141, which may be located throughout the private spaces within the secured site in order to provide the system-authorized individual, and others, an opportunity to request emergency assistance when the portable transmitter is either inaccessible or inconvenient to use.

Figure 4:
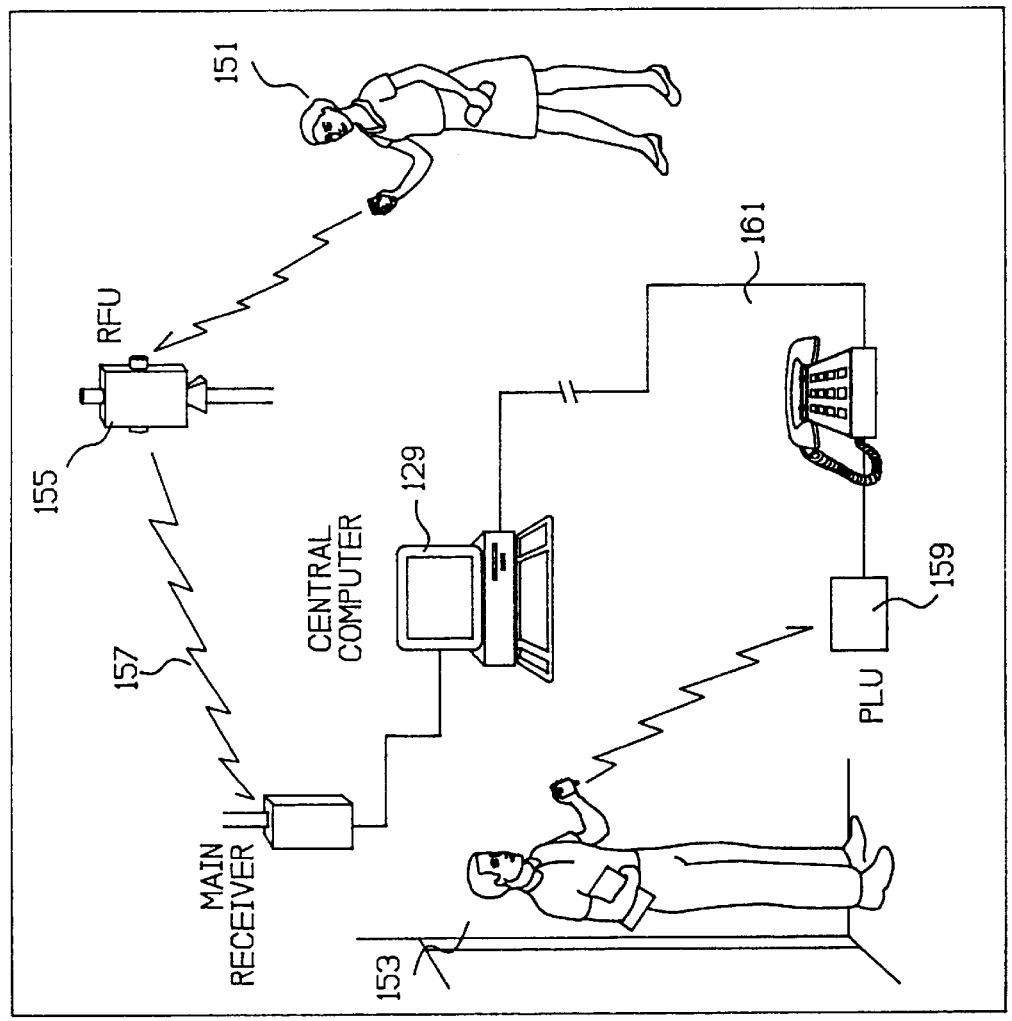
FIG. 4 is a pictorial representation of utilization of the security apparatus of the present invention in combination with a wireless security system, which is known in the prior art.

The security apparatus 11 in the present invention may be utilized in combination with prior art wireless alarm systems, such as the campus security system depicted and described in U.S. Pat. No. 4,998,095, which issued on Mar. 5, 1991 to Neal G. Shields, which is entitled "Emergency Transmitter" and which is commonly owned by the Assignee of this Application, and which is incorporated herein by reference as if fully set forth. The cooperative operation with the wireless system is depicted in FIG. 4. As is shown, system-authorized individual 151 may utilize the portable transmitter to call for emergency assistance when on the grounds of the secured site, such as within a parking lot, common space, or walkway. A plurality of receiver units, such as receiver 155, may be mounted in the public spaces or outdoor spaces of the secured site. The receiver receives the radio frequency wireless alarm signal and communicates via wireless link 157 to a main receiver which is connected to data processing system 129. In contrast, system-authorized individual 153 may utilize the portable transmitter within the secured site to generate an alarm transmission which is detected by receiver 159, and which communicates via electrical conductors 161 to central computer 129.

Figure 5:
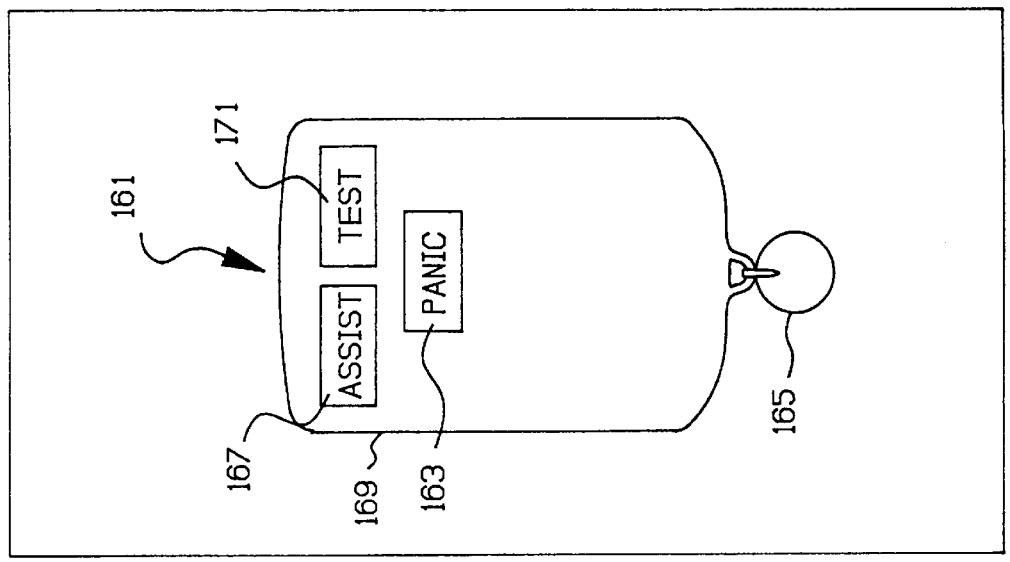
FIG. 5 is a pictorial representation of a portable transmitter.

FIG. 5 is a pictorial representation of the portable transmitter 161. As is shown, the portable transmitter includes a small plastic case 169 which may include a key-ring 165 to allow the transmitter to be used as a keychain fob in order to ensure its accessibility and availability. Furthermore, portable transmitter 161 includes an assist button 167, and a "panic button" 163. The assist button 167 may be utilized to request non-emergency assistance from security, housekeeping, building maintenance, or other amenity personnel within the secured site, such as a concierge, valet, or parking garage attendant. The portable transmitter 161 further includes a "panic button" 163 which may be utilized in order to summon emergency help from security personnel. Other and additional buttons may be provided on portable transmitter 161, such as test button 171. The test button may be utilized by security personnel in order to test the operation of security equipment. Alternative functionalities may be attributed to the additional buttons. For example, buttons may be dedicated to allow system-authorized individuals to open doors, gates, and the like, which control access to secured sites such as public buildings, parking garages or garage spaces. In other words, the additional buttons may be utilized to allow keyless and secured access to particular portions of the secured site. One other additional use may be to allow for the remote and wireless communication with automotive security systems, which would thus allow system-authorized individuals to carry a single portable transmitter which may be utilized in a variety of contexts to obtain differing functionalities, such as requesting non-emergency assistance from secured site personnel, requesting emergency assistance from security personnel, obtaining keyless access to secured public or private areas within the secured site, or activating and de-activating automotive security systems for the automobiles or vehicles owned by the system-authorized individuals.

Figure 6:
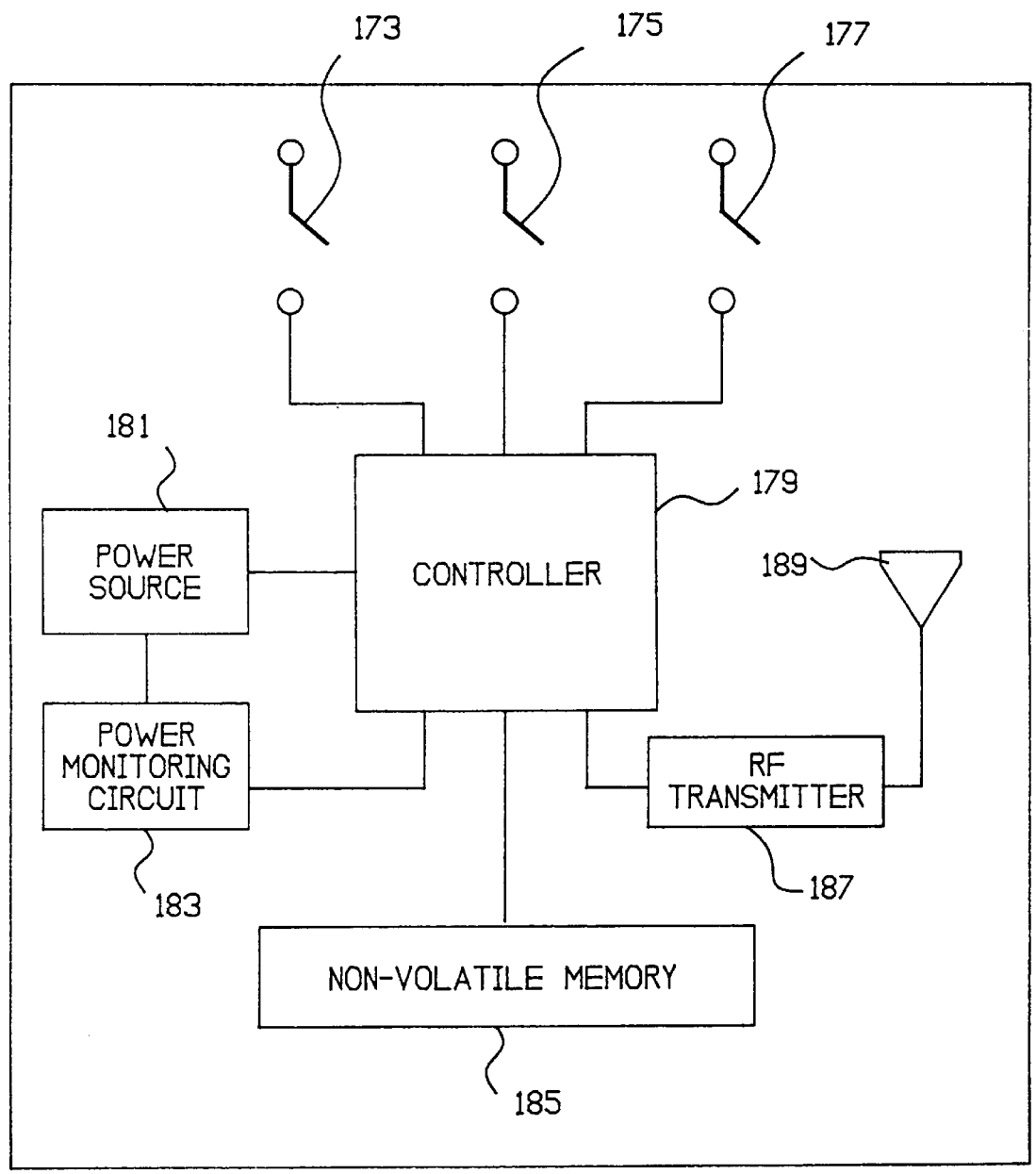
FIG. 6 is a block diagram and schematic representation of the electrical and electronic components contained within a portable transmitter.

FIG. 6 is a block diagram and schematic view of the preferred transmitter of the present invention. As is shown, multiple user-actuable switches, such as switches 173, 175, 177, electrically communicate with controller 179. Controller 179 and the other power-consuming electrical components may be powered by power source 181, which is preferably a battery. The operating condition (that is, strength) of the battery may be monitored by conventional means by power monitoring circuit 183, which provides an indication to controller 179 of battery strength. The pre-programmed code which is emitted by the portable transmitter may be carried in non-volatile memory 185 which may comprise any conventional non-volatile memory component, or which may alternately comprise any mechanical code-setting mechanism, such as DIP switches which are conventional in the low-cost security products. Controller 179 receives the code from memory 185, and commands from switches 173, 175, 177, and actuates radio-frequency transmitter 187 which utilizes antenna 189 to transmit a wireless radio-frequency alarm signal. Preferably, the alarm signal is a multi-bit transmission.

Figure 7:
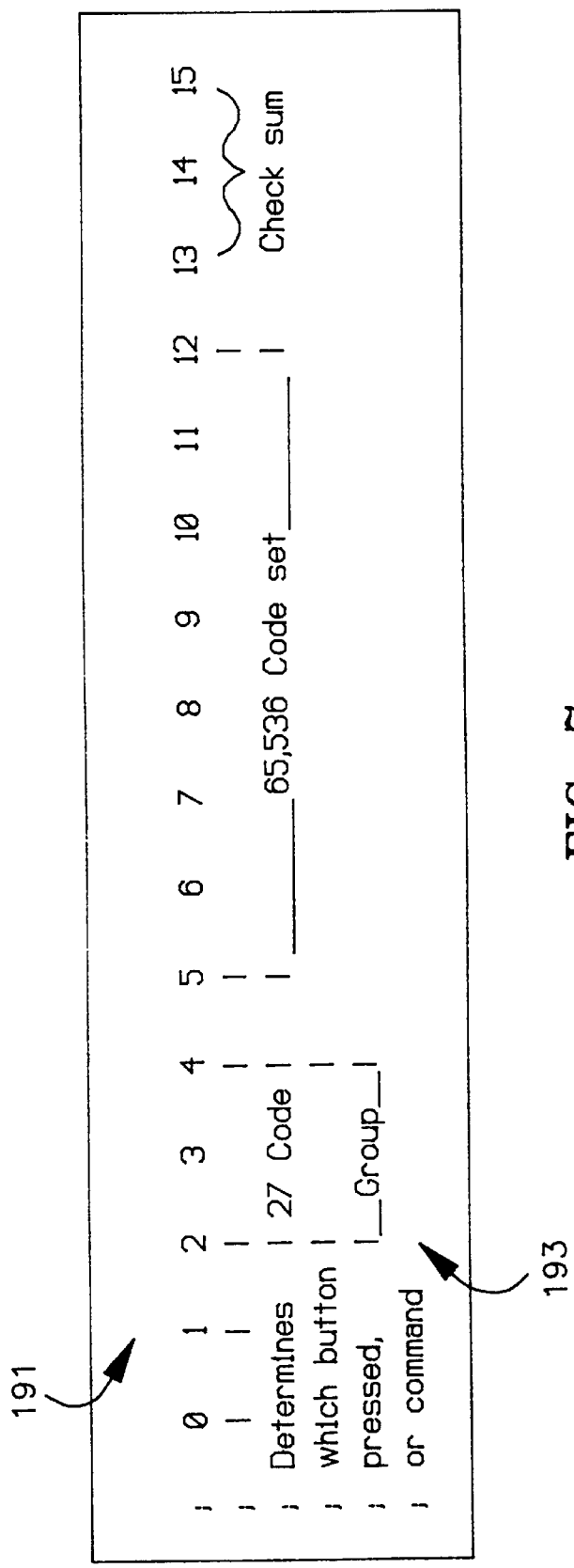
FIG. 7 is a schematic representation of the bits of the signals which may be generated by the portable transmitter.

FIG. 7 is a pictorial representation of the preferred transmitter signal utilized in the security apparatus of the present invention. Preferably, the transmitted signal is a 13-bit signal. FIG. 7 relates the 16 bits to their information content. As is shown, the bits 191 include bit 0, bit 1, bit 2, bit 3, bit 4, bit 5, bit 6, bit 7, bit 8, bit 9, bit 10, bit 11, and bit 12. As is shown, the bits 191 are mapped to their information content 193. As is shown, bits 0–1 provide information about which of the buttons on the transmitter were pressed. Bits 2, 3, and 4 define 27 different user groups which may be closely located to one another. This allows an office building with dozens of tenants to have different security systems operating side-by-side without interference between the security systems. Bits 5–12 define 65,536 different codes which may be identified to system-authorized individuals. Bits 13–16 provide a check system which is used to validate the transmission. All of this presumes that each bit is a four-state bit. In accordance with the present invention, this multi-bit signal may be compressed to allow transmission of the information with fewer than 13 bits.

Figure 8:
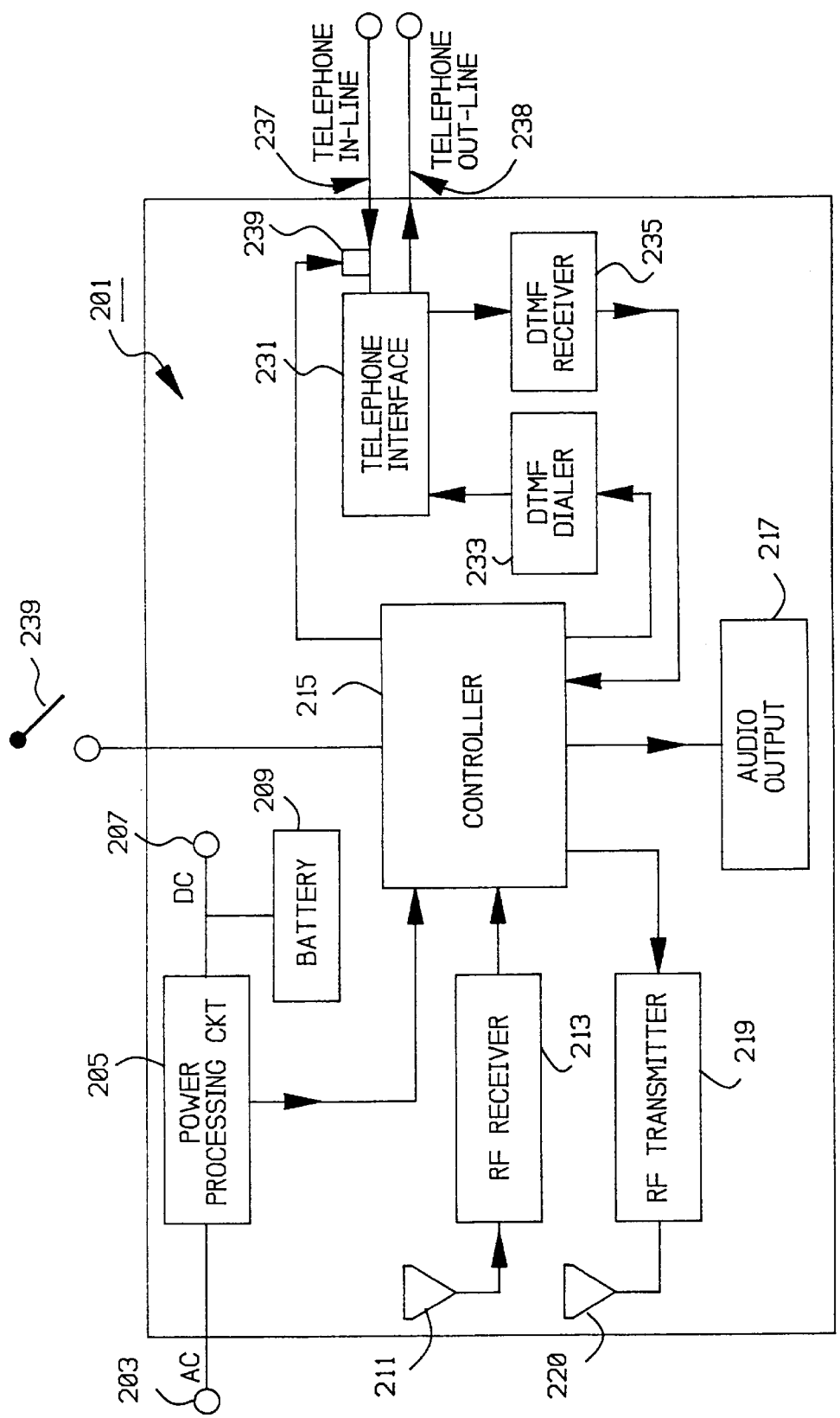
FIG. 8 is a block diagram representation of a receiver which may be utilized in the security apparatus of the present invention.

FIG. 8 is an electrical schematic and block diagram view of receiver 201 which is adapted for receiving alarm and other signals from the portable transmitters and for communicating a coded DTMF signal to a central processing unit in a security station manned by security personnel. As is shown, receiver 201 includes an alternating current input 203 which is directed to power processing circuit 205 which receives the alternating current and provides a direct current output 207. The direct current output 207 may charge battery 209 which will provide power for a predetermined interval if AC power is interrupted. Power processing circuit 205 provides a rudimentary signal to controller 215 to indicate whether or not AC power is being provided to power processing circuit 205. Receiver 201 further includes a radio frequency antenna 211 which receives the transmitted signals from the portable transmitters and provides it to radio frequency receiver 213 which conditions the signal and provides it as an input to controller 215. Controller 215 may selectively energize audio output to 217 which may comprise a conventional speaker or piezoelectric component which may be utilized to produced a plurality of sounds, each having a different tone, volume, and duration attribute. As will be discussed in detail herebelow, a high-volume and long-duration sound of a particular frequency or frequencies may be generated in the event of detection of an emergency or alarm signal from a portable transmitter. In contrast, a less irritating, lower-volume, and different tone sound may be generated by audio output 217 in the event a non-emergency transmission from a portable transmitter is detected by receiver 201. The audio signal produced can serve different functions. In an emergency condition, the audio signal can serve to alert a victim or potential victim, an assaulter or criminal, and any bystanders or passersby of a detected emergency condition. This may cause the criminal or intruder to retreat quickly, thus ensuring the safety of the victim or potential victim. If a non-emergency transmission is detected, audio output 217 may be utilized to produce a tone which merely serves to confirm to the user that the request for non-emergency assistance has been received.

Receiver 201 preferably further includes antenna 220 and radio frequency transmitter 219 (which is preferably similar to the transmitters depicted and described in connection with FIGS. 5, 6, and 7). In the event that controller 215 is alerted to an interruption of power, it may utilize transmitter 219 to send a radio frequency alarm signal which may be picked up by receivers which are located in adjoining or adjacent rooms. In this manner, if a criminal attempts to disarm the receiver 201 by interrupting power to the receiver, an alarm condition signal may be generated which will give rise to security personnel investigation. This ensures that the security apparatus of the present invention is substantially resistant to criminal tampering, either prior to or during a criminal enterprise or assault.

In accordance with the present invention, receiver 201 also includes a telephone interface circuit 231 which communicates with controller 215 and DTMF dialer 233 and DTMF receiver 235 to allow the generation and communication of a signal over the telephone lines 237 in the form of a series of DTMF signals which communicate to security personnel at a security console the identity of the transmitter which generated the request for assistance or alarm condition, as well as the identity (and thus location) of the receiver 201 which has received a valid transmission from one or more personal transmitters. As an alternative to use of DTMF receiver 235, controller 215 may be programmed to perform the functions of DTMF receiver 235. This alternative could lower the cost of receiver 201. In accordance with the present invention, telephone interface 231 simply comprises telephone jacks and electrical wiring which facilitate the pass-through of ordinary electrical signals from the telephone (not depicted) which come in on telephone in-line 237, and which pass out through telephone out-line 238, but the telephone interface 231 may also include a conventional ringing signal generator which is under the control of controller 215 and which may be utilized to ring any associated telephone. An electrically-actuated switch 239 is provided between telephone interface 231 and telephone in-line 237. It is electrically controlled by an output pin of controller 215 and can be utilized to disconnect the telephone in the event of detection of a valid alarm signal. This will terminate any ongoing telephone call during the detection of an alarm condition, and prevent utilization of the associated telephone from interfering with the transmission of a telephonic communication from receiver 201 to the data processing system maintained at the security console under control of security personnel. In accordance with the present invention, the DTMF dialer 233 is directly controlled by controller 215 and is utilized to generate a series of DTMF signals which may pass outward from receiver 201 on telephone out-line 238 in the event of detection of a valid signal from the portable transmitter. DTMF receiver 235 is preferably utilized to allow communication from the security station to receiver 201, as will be discussed in greater detail below.

Preferably, controller 215 includes a plurality of pre-programmed routines which are utilized to perform the functions required of receiver 201.

There are four basic modes of operation which are preferably included in the security apparatus 11 of the present invention. First, there is an emergency transmission mode of operation, during which receiver 201 receives a valid radio frequency transmission from a portable transmitter which indicates that an emergency condition exists. Second, there is an assist transmission mode of operation, wherein receiver 201 receives a valid radio frequency transmission from a portable transmitter which indicates a non-emergency request for assistance. Third, a check-in mode of operation is preferably provided, wherein building or security personnel either manually or automatically transmit a radio frequency signal which allows building and security personnel to locate and map the travel and work paths of building and security personnel. This is especially useful in helping building management to locate cleaning and repair crews which may be working throughout the secured site. Additionally, this may be useful in helping security personnel track security officers as they sweep through the secured site. In either use, the check-in mode of operation allows management to determine whether or not its personnel is doing its job, and allows management to create a record of the travel and work paths of various personnel distributed throughout the secured site. Fourth, a programming mode of operation is provided which allows a programming unit, such as programming unit 137 of FIG. 3 to be utilized by security personnel to program and test the operating condition of the receivers throughout the secured site.

Figure 9:
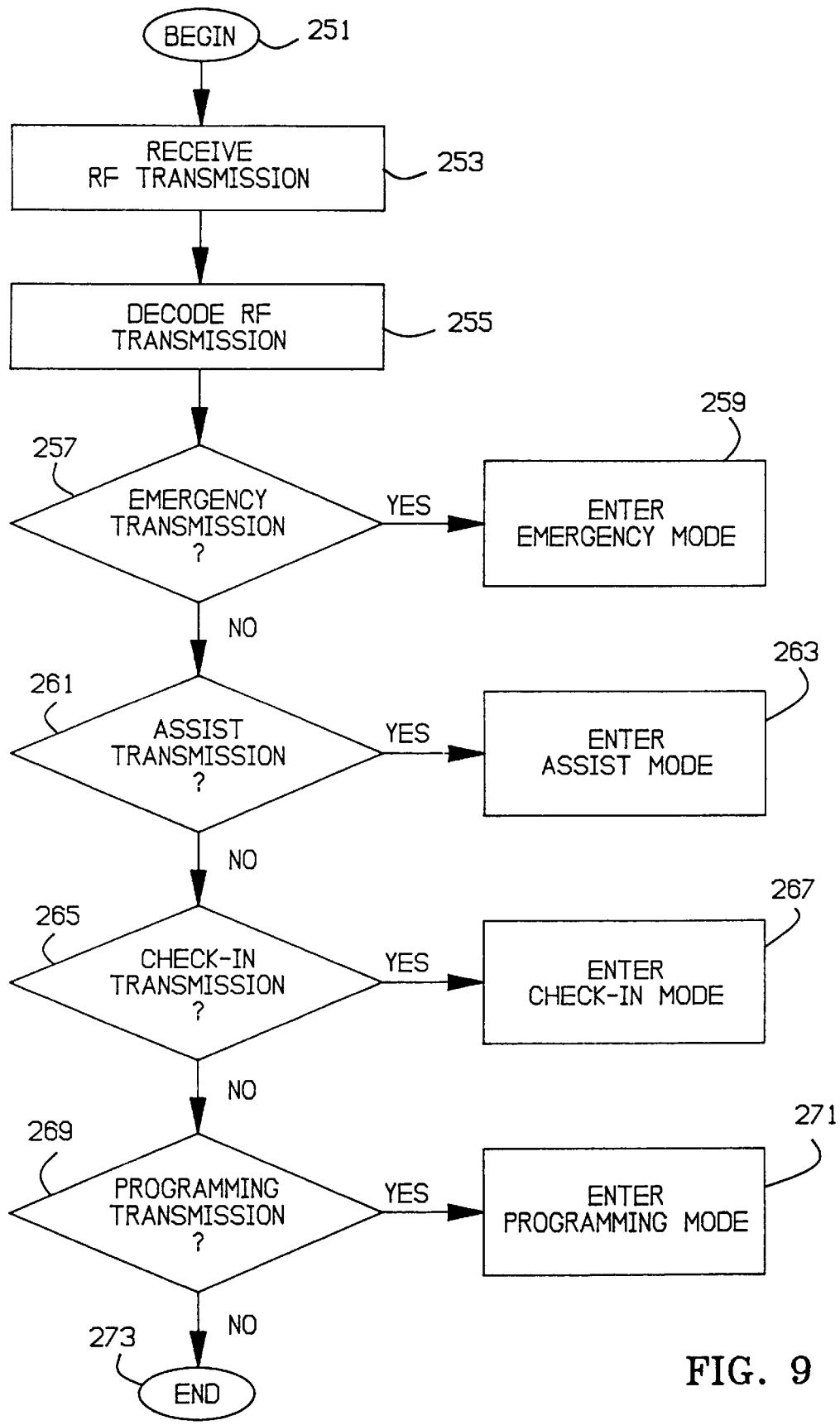
FIG. 9 is a block diagram representation of the manner in which received transmissions are handled initially by a receiver apparatus.

FIG. 9 is a high-level flow chart representation of the manner in which receiver 201 of FIG. 8 is programmed to handle various transmissions which may be received. The process begins at software block 251 and continues at software block 253, wherein receiver 201 receives a radio frequency transmission from a portable transmitter. In accordance with software block 255, the controller 215 of receiver 201 decodes the transmission and cooperates with the security data processing system to determine what type of transmission has been received and to determine whether it is a valid transmission. This is best explained with reference to FIG. 7. For example, bits 1 and 2 are examined to determine which particular buttons have been depressed upon the portable transmitter. The next three bits (bits 2 through 4) are examined to determine whether the transmission is from the particular "group" established for the secured site. This allows different security personnel and systems to coexist side-by-side utilizing the same technology without causing spurious emergency or other transmissions. Controller 215 may be preprogrammed to identify the particular group that it belongs to. Bits 2 through 4 of FIG. 7 may be utilized to designate any particular one of 27 available groups. If controller 215 determines that the received transmission is from its group, it proceeds by then examining bits 5 through 12 of FIG. 7 in order to determine which particular transmitter generated the radio frequency transmission. Since 65,536 unique codes are available, controller 215 may be programmed to determine whether or not the unique code falls within the range of codes which have been issued to authorized users. This also prevents the detection of spurious or unrelated signals. Returning to FIG. 9, only if a valid code has been detected in software block 255 will the process continue. If a valid code has been detected, the process continues by examining the transmission to determine what type of condition has been indicated.

In accordance with software block 257, controller 215 of receiver 201 examines the appropriate bits against a table stored in memory to determine whether an emergency transmission has been received; if so, the process continues in software block 259, wherein controller 215 and receiver 201 call a preprogrammed routine for an emergency condition mode of operation. If the transmission is determined to be something other than an emergency transmission, the process continues in software block 261, wherein controller 215 examines the appropriate bits to determine whether the transmission indicated a request for assistance. If so, the process continues in software block 263 by entry into an assist mode of operation; if not, the process continues in software block 265, wherein controller 215 examines the appropriate bits to determine whether a check-in transmission has been received. If so, the process continues in software block 267, wherein controller 215 of receiver 201 enters a check-in mode of operation. If it is determined in software block 265 that a check-in transmission has not been received, the process continued in software block 269, wherein controller 215 of receiver 201 examines the appropriate bits to determine whether a programming transmission has been received. If so, the process continues in software block 271, wherein controller 215 of receiver 201 enters a programming mode of operation; if not, the process ends at software block 273.

Figure 10A:
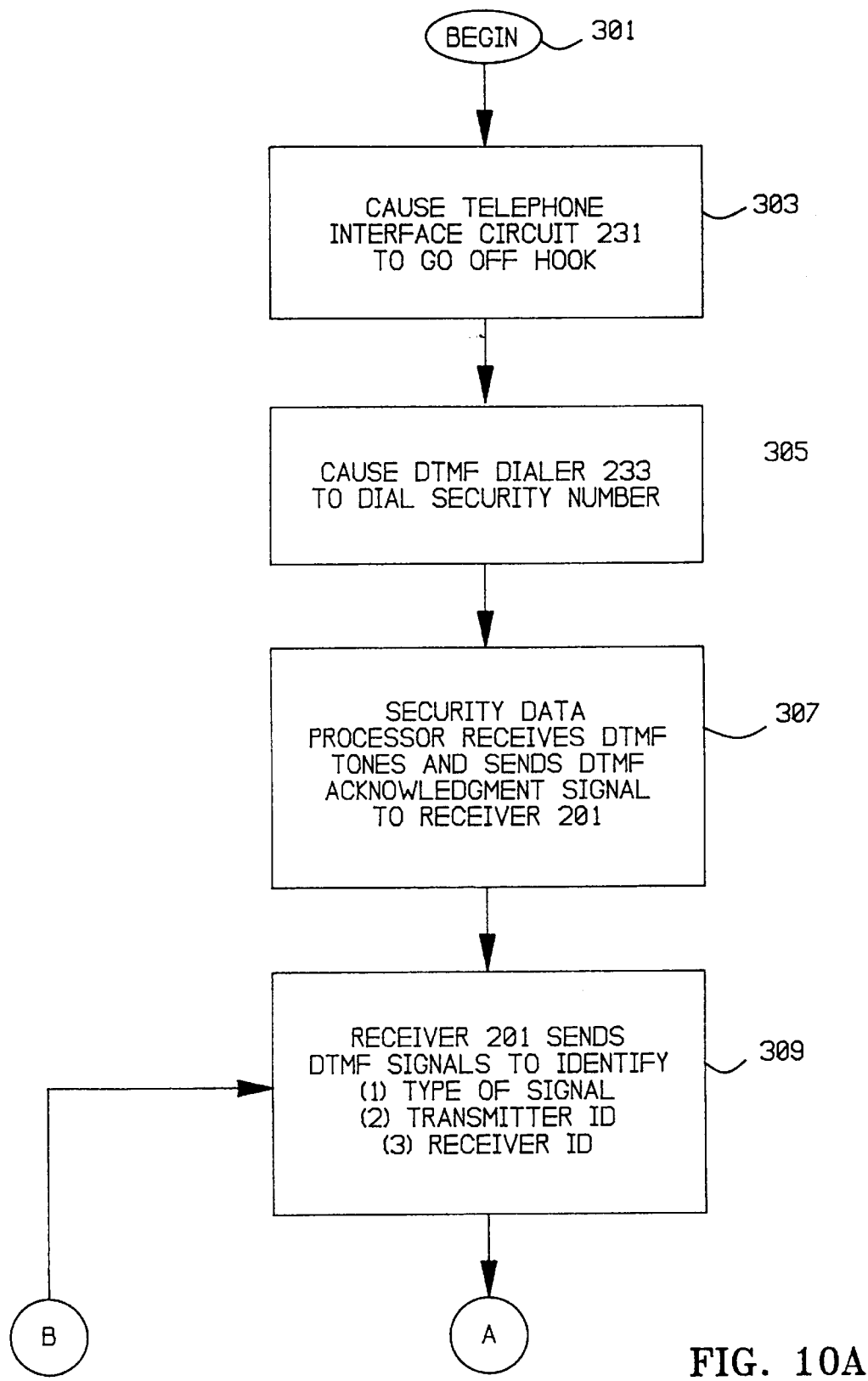
FIG. 10 is a flow chart representation of the coordinated operation of receiver and the security data processing system in a response to detection of a wireless signal.
Figure 10B:
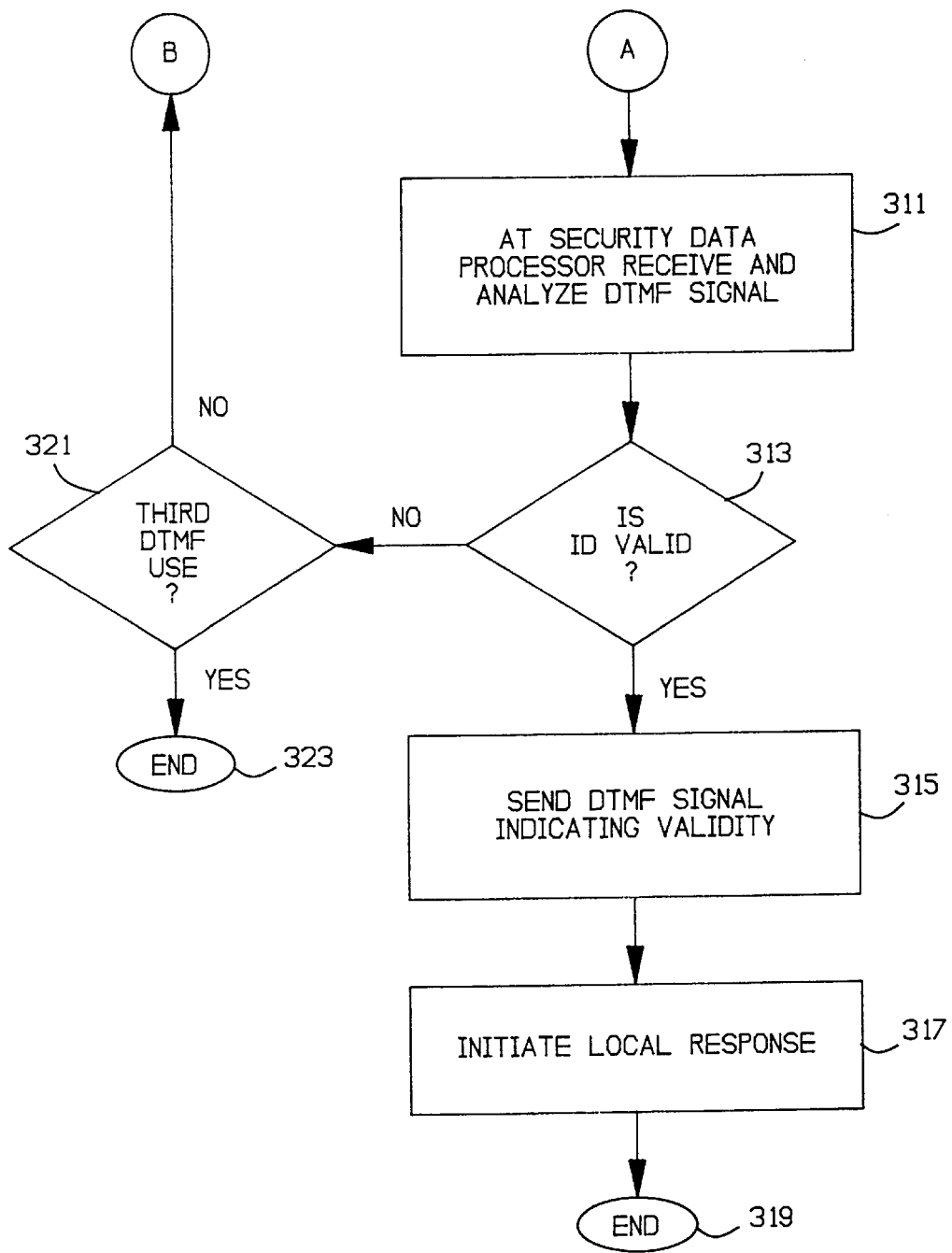

FIG. 10 is a flow chart representation of the interaction of receiver 201 and the security data processing system. The process begins at software block 301 and continues at software block 303, wherein controller 215 of receiver 201 sends a command signal to telephone interface circuit 231, causing the telephone interface circuit to go "off hook", thus allowing telephone communication via telephone out-line 238 by DTMF dialer 233. In accordance with software block 305, controller 215 sends command signals to DTMF dialer 233, causing DTMF dialer 233 to dial the security telephone number associated with the data processing system at the security console. Then, in accordance with software block 307, the security data processing system receives the DTMF tones and sends a DTMF acknowledgment signal to receiver 201 which is received by DTMF receiver 235 and communicated to controller 215. Basically, the acknowledgment signal informs controller 215 that the line of communication has been established. In accordance with software block 309, receiver 201 then utilizes controller 215 to cause DTMF dialer 233 to send a series of DTMF signals which identify (1) the type of signal received from the portable transmitter (i.e., a request for non-emergency assistance, a request for emergency assistance, a check-in signal, or a request for programming); (2) the identification number associated with the portable transmitter (such as that depicted in FIG. 7); and (3) the identification of receiver 201, which is preferably numeric or alphanumeric. Then, in accordance with software block 311, the data processing system at the security console receives and analyzes the DTMF signals. The data processing system may determine what type of signal has been received, the transmitter identification, and the receiver identification. Then, in accordance with software block 313, the data processing system at the security console determines whether the transmitter identification is a valid identification; if not, the process continues in software block 321, wherein the data processing system determines whether the DTMF signal has been analyzed three previous times. If it is determined in software block 321 that the DTMF signal has been analyzed three times, the process continues in software block 323 by ending. If three transmissions of the DTMF signal have been received and analyzed by the security data processing system without the identification of a valid transmitter identification, the data processing system assumes that the signal which has been received is a spurious signal or a signal emanating from a transmitter not belonging to the security system, but to some other security system. However, if it is determined in software block 321 that three consecutive attempts to analyze the DTMF have not yet occurred, the processor returns control to software block 309. If it is determined in software block 313 that a valid identification has been received, the process continues in software block 315, wherein the security data processing system sends a DTMF signal to receiver 201 which indicates that a valid transmitter signal has been received. In accordance with software block 317, receiver 201 then initiates a local response. If the type of signal which has been received is an emergency signal, receiver 201 is preprogrammed to actuate audio output to 317 to generate an urgent, high-amplitude and easily discernible alarm sound. This may be accomplished by conventional means. Additionally, receiver 201 may additionally command telephone interface 231 to initiate a ringing signal which is passed to the telephone associated with receiver 201 to ring the telephone. Both of these audio responses to the detected emergency condition signal reassure the system-authorized user that the call for emergency relief has been received, and simultaneously serve to deter an intruder or criminal and cause him/her to flee.

If the type of signal received is a request for non-emergency assistance, a less irritating, lower volume signal may be generated by controller 215 sending control signals to either audio output 217 or to telephone interface 231. If the received transmission is a check-in transmission or a programming transmission, other, different and less irritating or noticeable audio responses may be generated by controller 215 sending command signals to either audio output 217 or ringing signals to the telephone through telephone interface circuit 231.

In accordance with the present invention, an emergency transmission is acknowledged in a couple of different ways. Upon receipt of the radio frequency signal, receiver 201 generates a constant beeping tone until the security data processing system confirms that a valid emergency condition signal has been detected. At that time, receiver 201 changes from a steady beeping sound to a very high-volume modulated sound which may have some deterrent effect on intruders and criminals.

In accordance with the present invention, the audio response of receiver 201 may be preprogrammed to allow for a silent interval until the security data processing system acknowledges the validity of the transmission. The duration, intensity, and pattern of the audio output of receiver 201 may be custom programmed with programmer 137 during installation to provide differing audio responses for differing environments.

Figure 11:
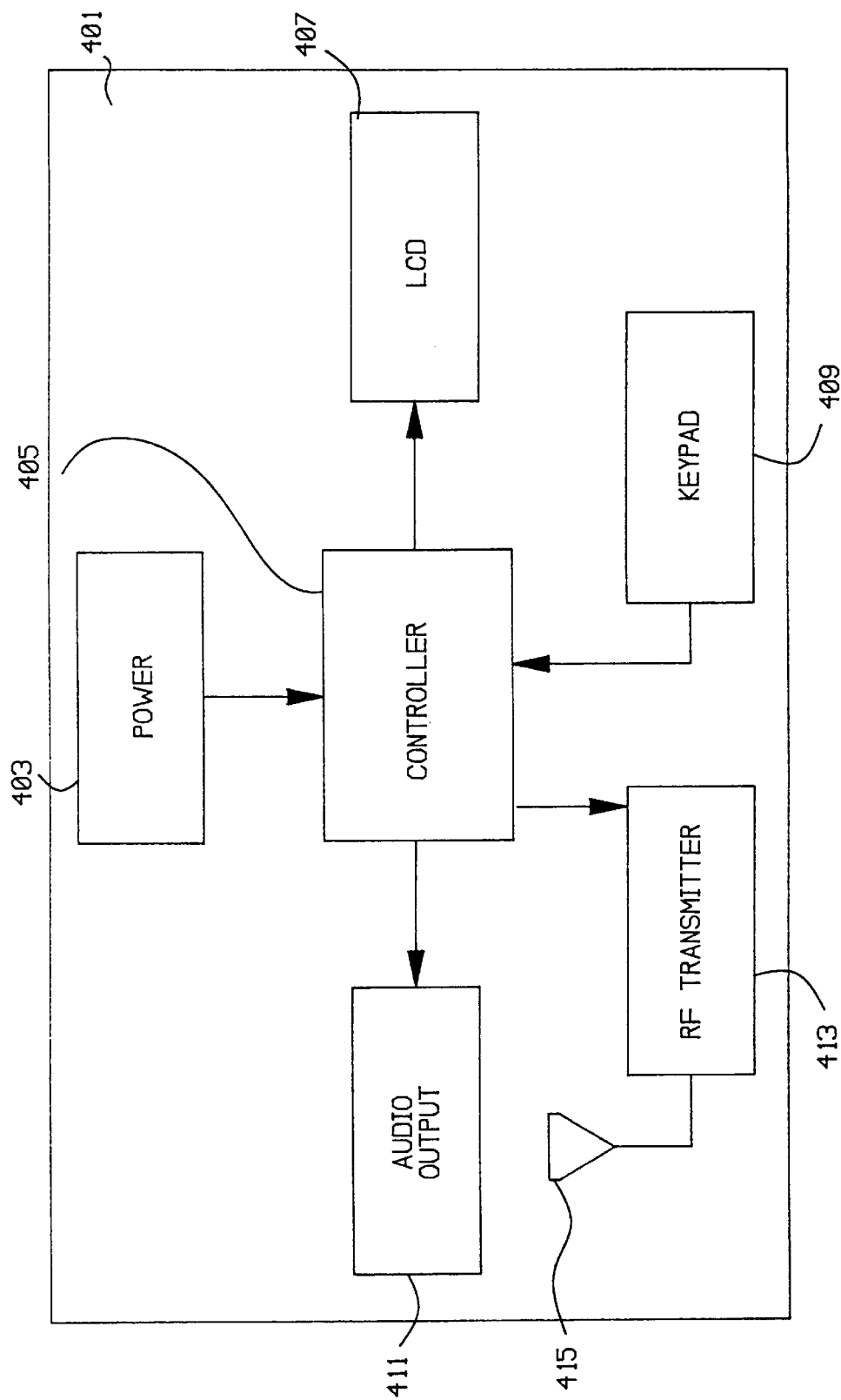
FIG. 11 is a block diagram depiction of a hand-held radio frequency programming unit which may be utilized to program the receivers in accordance with the present invention.

FIG. 11 is a block diagram representation of programming unit 401 which may be utilized to program the receivers of the security apparatus 11 of the present invention. As is shown, programming unit 401 includes a power source 403, which is preferably a battery, which provides power to controller 405 and the other electrical-power consuming components of programming unit 401. Controller includes in memory program instructions which facilitate utilization of programming unit 401 by allowing for a question and answer dialogue to be maintained between programming unit 401 and the user through use of liquid crystal display 407 and alphanumeric keypad 409. Programming unit 401 further includes audio output 411 which may be selectively actuated by controller 405 to provide audio prompts and confirmation signals. Furthermore, programming unit 401 includes radio frequency transmitter 413 which is under the control of controller 405, and which utilizes antenna 415 to communicate with the receivers, such as receiver 201, utilizing radio frequency transmissions. The computer programs resident in receiver 401 will now be described.

The programming unit 401 will utilize LCD display 407 to display a primary menu. A "Select" prompt is shown on the LCD display 407, and the following menu items are displayed, with a brief textual description supplied:

1. Chirp Target Unit (Unit Under Test)

Causes target receiver unit to chirp. This is a good tool to test if the target unit is properly receiving commands.

2. Enter Station ID Number

This enters the station number in memory in the keyboard unit. This is used if the keyboard unit must communicate with a specific station ID number. Four digits must be entered (0000-9999).

3. Program Target Unit Station ID Number

This programs the target unit with its station ID number. Four digits must be entered (0000-9999). When the target unit has received, written and verified, the receiver will produce three chirps.

4. Enter Group ID Number

This enters the group number in memory in the keyboard unit. This is used when the keyboard unit is addressing a target unit within a specific group. This is a two digit entry (0–27).

5. Program Target Unit Group ID Number

This programs the target unit with its group ID number. The target unit will chirp to acknowledge. This is a two digit entry (0–27).

6. Program Target Unit Phone Number

This will program the target unit with the telephone number that it will call to communicate with the security data processing system. The phone number will be received, written to RAM, written to EE, read back to RAM, and verified. The user will be prompted for the telephone number. The user may enter the digits 0 through 9. A period (".") will cause a one-second pause. Therefore, if it is necessary, for example, to dial "9" for an outside line, one would enter "9.5551212". One may enter up to fifteen digits. When the number has been entered, the user will see "SENDING" in the display. When "SENDING" disappears from the display, a chirp should be heard from the target unit, confirming the programming of the number.

P—Option Selection

When the keyboard unit is turned on, it defaults to a mode whereby it will communicate with all target units. There are two options that may be set that will narrow down the target units for communication.

"COM RCV W/UNT?"

If this is answered "Y", only a unit with the same station ID number as the keyboard unit (as entered via selection 5 above) will respond.

"COM RCV W/GRP?"

If this is answered "Y", only units with the same group code as the keyboard unit (as entered via selection 7 above) will respond.

These options can be important when trying to address units in close proximity. In a hotel installation, for example, where two or more units may be in close proximity, it would be desirable to use the option where only a specific station number is addressed.

Figure 12:
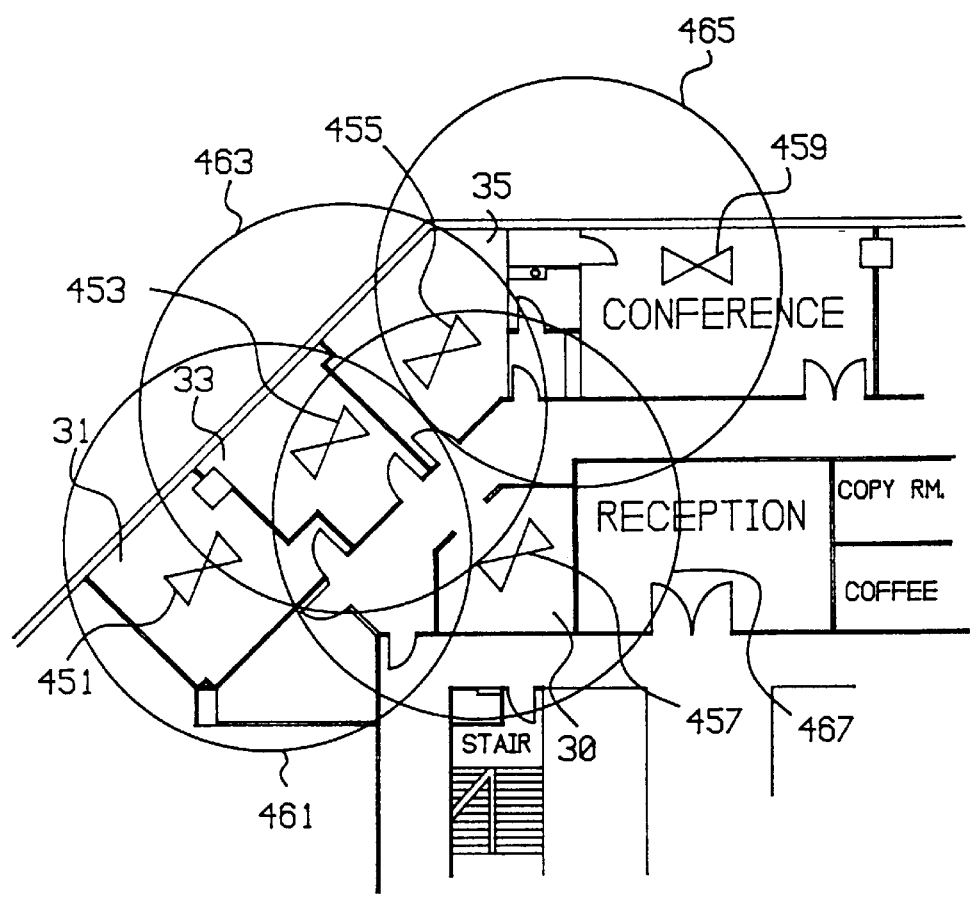
FIG. 12 is a pictorial representation of receiver placement to allow for overlapping reception coverage within a secured site.

In accordance with the present invention, the receivers of the security apparatus should be laid out in a pattern which ensures that a system-authorized user may communicate a wireless alarm or other signal to at least one receiver. Preferably, the receivers are located to allow substantial overlap in their reception area. FIG. 12 is a fragmentary view of a portion of the floor plan of FIG. 2. As is shown, room 31 includes receiver 451 which has a reception area defined by circle 461. Room 33 has a receiver 453 which has a reception area defined by circle 463. Room 35 has a receiver 455 which has a reception area defined by circle 465. Room 30 has a receiver 457 which has a reception area defined by circle 467. As can be seen, there is substantial overlap in the reception area of each of the receivers 451, 453, 455, 457. In this manner, all of the public and private spaces of the secured site may be within the reception range of a receiver. This serves an additional function. As was discussed above, each receiver includes within it a transmitter which emits an emergency condition signal when interruption of power (which evidences tampering) is detected. In this way, each receiver may transmit to an adjacent or adjoining space, and have the alarm condition signal detected by another receiver.

The monitoring systems utilized in the security apparatus of the present invention will now be discussed in detail. The preferred monitoring equipment comprises a security data processing system 510 which depicted in FIG. 13. As is shown, security data processing system 510 includes a conventional central processing unit 511, with accompanying memory, hard drive, floppy drives, audio driver board, and other conventional components. A video display 514 is also provided to display text and images which are utilized by the security personnel during monitoring operations. A keyboard 516 and/or graphical pointing device 520 may also be provided. The keyboard includes numerous keys which are utilized to enter data. The graphical pointing device 520 (such as a mouse) includes buttons 524, 526 which are utilized to select options utilizing conventional "clicking" operations, and to move data utilizing conventional "drag and drop" operations. Data processing system 510 further includes a scanning device 528 which may be utilized to scan photographs of the system-authorized users. In accordance with the present invention, a database is constructed which relates identifying and biographical information relating to a particular system-authorized user to a particular transmitter ID number.

Figure 13:
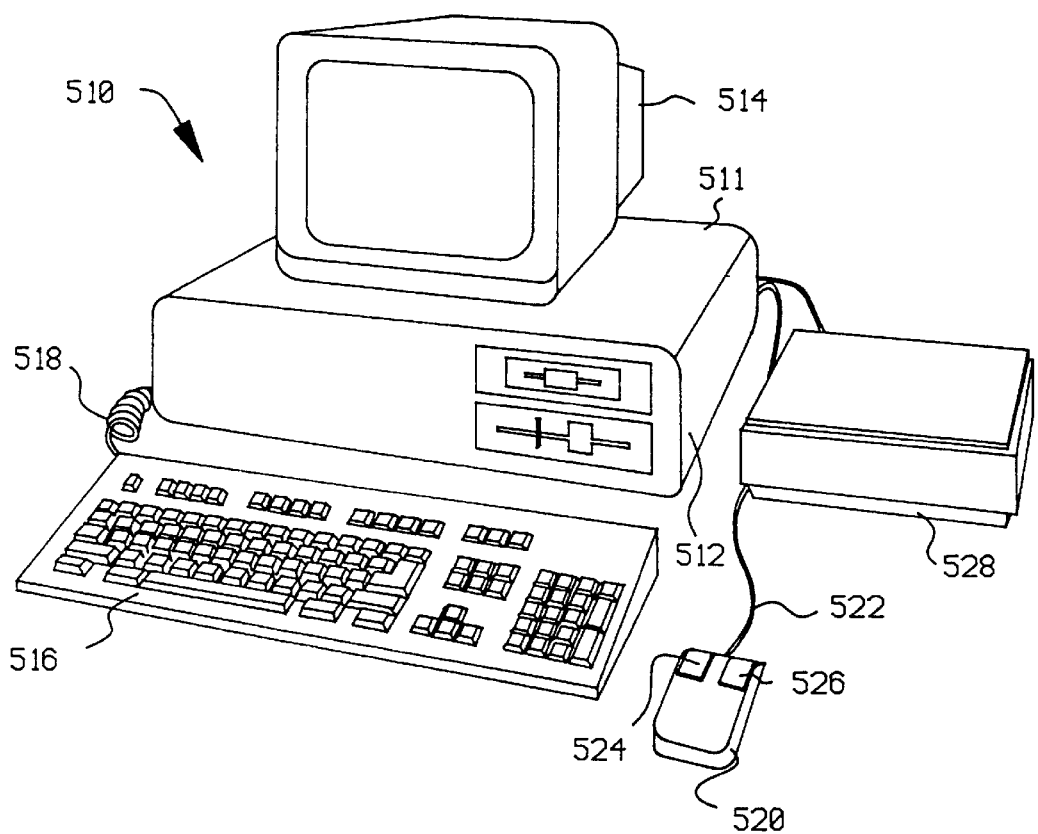
FIG. 13 is a pictorial representation of a security data processing system in accordance with the present invention.
Figure 14:
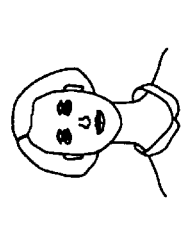
FIG. 14 is a pictorial representation of a user screen for obtaining and organizing information relating to system-authorized users.

FIG. 14 is a depiction of the type of display presented on monitor 514 of security data processing device 510 (of FIG. 13). As is shown, a particular system-authorized user is identified by a transmitter ID, his/her name, the room and/or floor that the individual utilizes, any medical conditions that are known, the identity of the system-authorize user's physician, and other information relating to emergency contacts for the system-authorize user in the event of a medical or other emergency. Additionally, descriptive information is provided relating to the system-authorized user such as gender, age, weight, height, race, hair color, eye color and any other identifying information. Furthermore, the data processing system allows scanning device 528 of security data processing system 510 to be utilized to scan a photograph of the system-authorized user. Additionally, a map may be provided identifying the room or rooms which the system-authorized user has primary access to.

Figure 15:
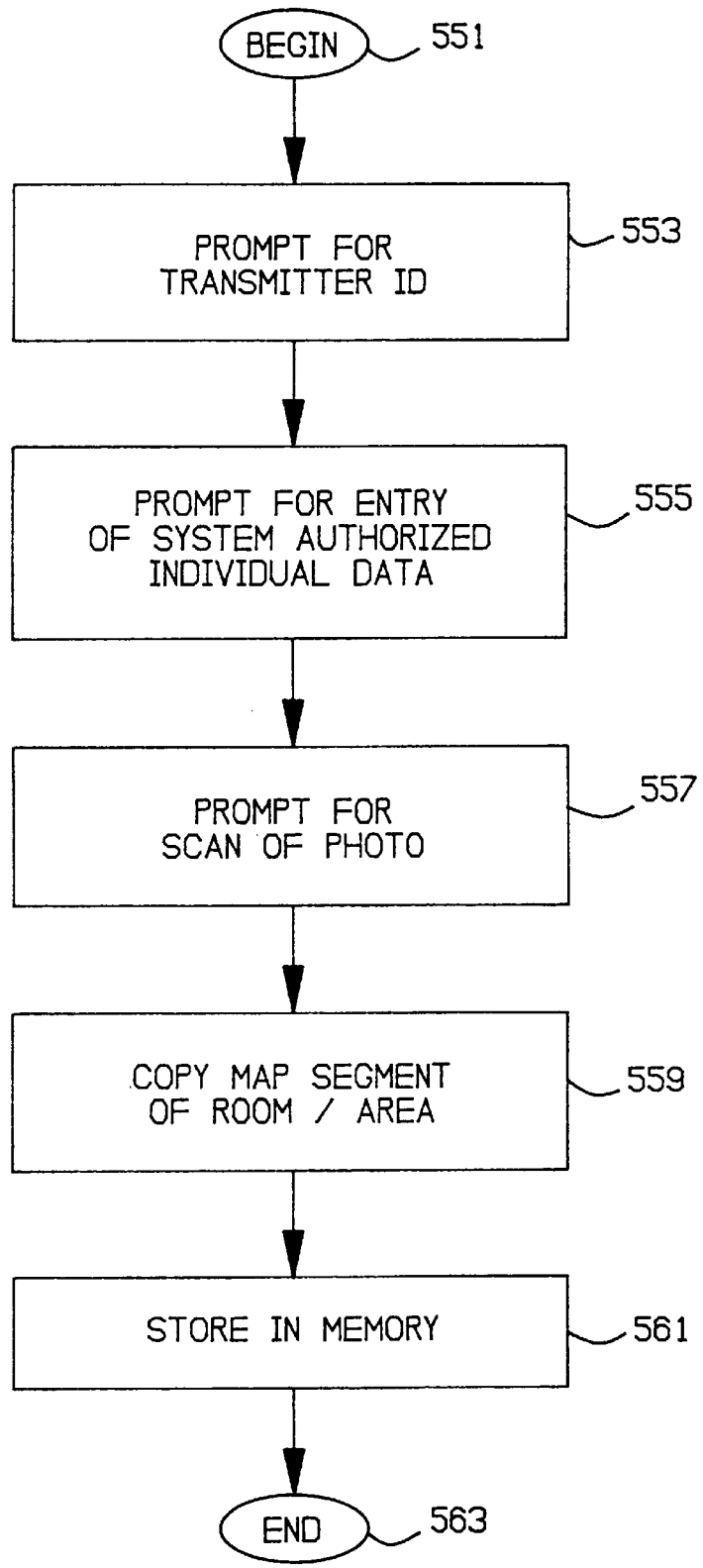
FIG. 15 is a flow chart representation of the software utilized to obtain user information.

FIG. 15 is a flow chart representation of the software modules which are utilized when adding a system-authorized user to the database. The process begins at software block 551 and continues to software block 553, wherein a screen is displayed which prompts for the entry of the transmitter identification number. Then, in accordance with software block 555, the security data processing system 510 prompts for entry of identifying data for the system-authorized individual, such as the system-authorized user information 571 and the descriptive information 573 of FIG. 14. Then, in accordance with software block 557, the security data processing system 510 prompts for the scanning of a photograph of the system-authorized user. In FIG. 14, the scanned image 575 is displayed along with the textual information. The scanning is accomplished utilizing conventional scanning devices, and a bit-map is created for the video image. When the data base calls for information relating to a particular system-authorized user, the bit-map associated with the system-authorized user is retrieved from memory and located in the video display in manner which relates the image to the textual information. Next, in accordance with software block 559, the security data processing system 510 copies a map segment from map segments stored in memory of the room/area occupied by the particular system-authorized user being added to the data base. Next, in accordance with software block 561, security data processing system 510 stores the textual and visual information as a record in any conventional data base format, such as relational data base, in security data processing system memory, such as the security data processing system hard drive. The process ends at software block 561, and the security data processing system is ready for the entry of information relating to the next system-authorized user.

Figure 16:
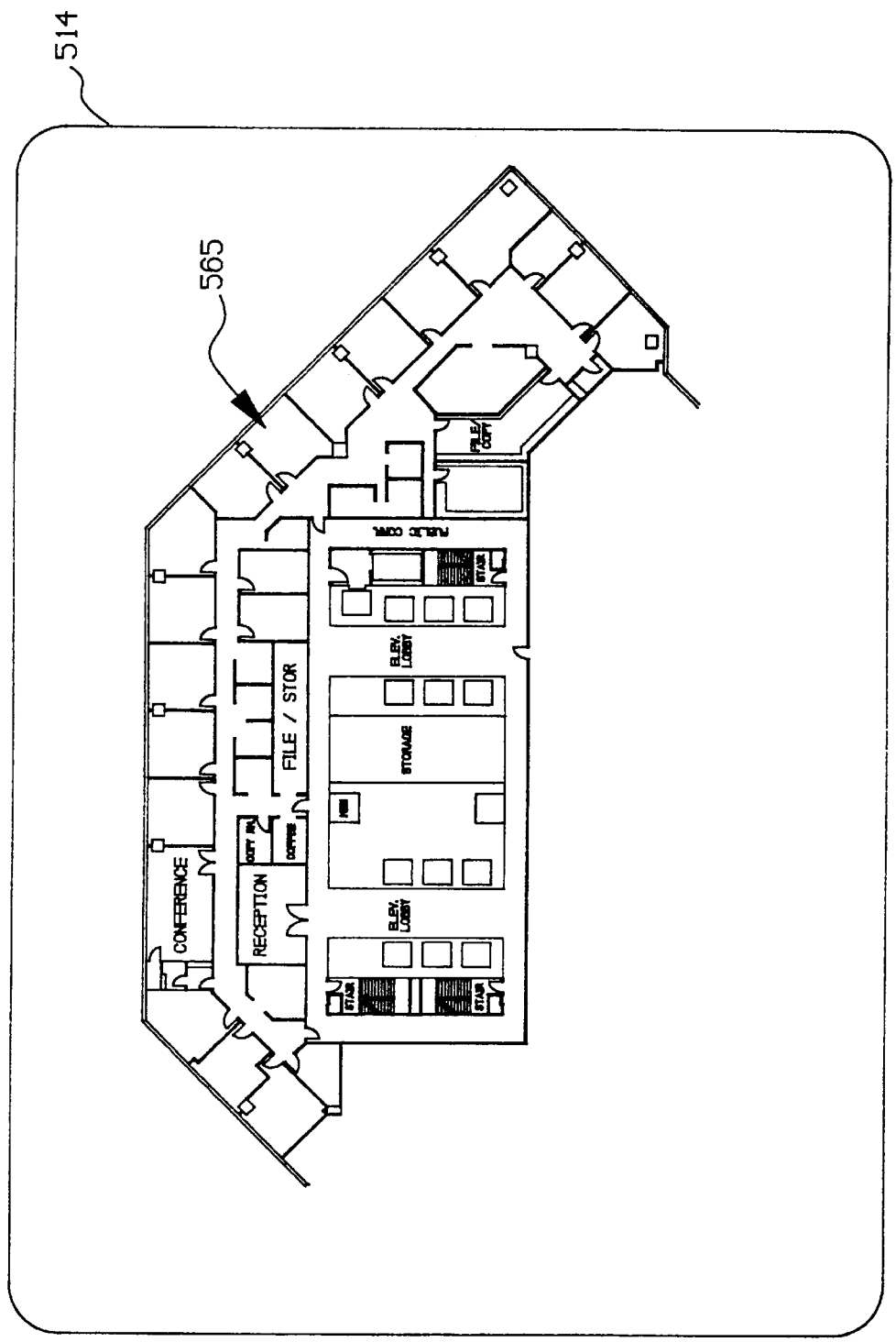
FIG. 16 is a pictorial representation of a user screen generated as a result of an emergency condition signal.

During monitoring operations, if an emergency condition signal is received, security data processing system 10 will automatically display a bit-map of the secured site, such as that depicted in FIG. 16 with one or more visual indicators indicating the particular site of the detected transmission. This is accomplished by reading the alarm signal to determine the receiver identification number, which correlates to a particular public or private space within the secured site. A bit-map is retrieved from memory which depicts preferably a map (such as the floor plan in FIG. 16) of the secured site, with a visual indicator, such as arrow 565, which indicates the receiver which detected the alarm condition signal. When substantial overlap in receiver ranges is provided, more than one public or private space may be highlighted or indicated in the bit-map. In this case, the textual and visual information generated regarding the system-authorized user may be displayed on video display 514 (such as shown in FIG. 14) and that information may be utilized by security personnel in order to determine the likely site of the system-authorized user. The descriptive and other information may be utilized in order to identify the system-authorized user and to prevent a mistake in identity which either frustrates the security response or which facilitates the perpetrator of a crime in avoiding detection or escaping. For example, if an alarm condition is detected, and security personnel discover one or more individuals involved in an altercation or confrontation, the identifying information may be communicated to security personnel to allow security personnel to identify the system-authorized user and, by inference, to identify the intruder or criminal. If multiple alarm responses are detected from multiple receivers, the information pertaining to the particular rooms and/or floors occupied by the system-authorized user will facilitate pinpointing the incident.

Security apparatus 11 in the present invention also provides security personnel with a log or record of all communications from the receivers within the secured site. FIG. 17 depicts a monitoring display on video display 514 of security data processing system 510 (of FIG. 13). As is shown, the screen is split into two parts. The upper part of the screen contains "supervisory data" 601 and the lower part of the screen contains emergency and assist calls data 613. Several columns of data are provided and displayed within the supervisory data 601, such as type of call column 603, receiver ID column 605, transmitter ID 607, date 609, and time 611. In accordance with the present invention, the security data processing system 510 is programmed to receive the DTMF information from the receivers and to display the type of call, receiver ID, and transmitter ID in column form. Additionally, a date and time clock is provided which will post date and time information for each received transmission. The supervisory data 601 includes test calls and check-in transmissions, all of which allow building management and security personnel to monitor employee movement and activity throughout the secured site. The lower half of the screen of FIG. 17 includes emergency and assist call data 613, which is also arranged in columnar form with type of call column 615, receiver ID column 617, transmitter ID column 619, date column 621, and time column 623. The DTMF communications received from the receivers are analyzed to determine the type of call, the receiver identification, and the transmitter identification, all of which are posted to the appropriate columns within the emergency and assist calls data 613 portion of video display screen 514. Once again, a date and time stamp is utilized to post the date and time for each received communication.

In accordance with the present invention, computer program instructions are provided to generate an audible emergency call announce when an emergency transmission has been detected. For example, a pre-programmed synthesized human voice announce may be provided to generate the audible word "Emergency". This ensures that security personnel will be visually and audibly alerted to the existence of an emergency condition, thus minimizing the possibility that security personnel will be distracted and thus miss an opportunity to respond timely to an emergency condition. In accordance with the present invention, a graphical pointing device or cursor may be utilized to scroll upward or downward within the columnar information provided within the supervisory data 601 and the emergency and assist call data 613. Preferably, the computer program will continue the audible emergency condition signal indicator until the cursor or graphical pointing device is utilized to acknowledge the emergency condition by depression of the entry key or by clicking the graphical pointing device. In this manner, positive action is required before the audible response is discontinued.

Figure 18:
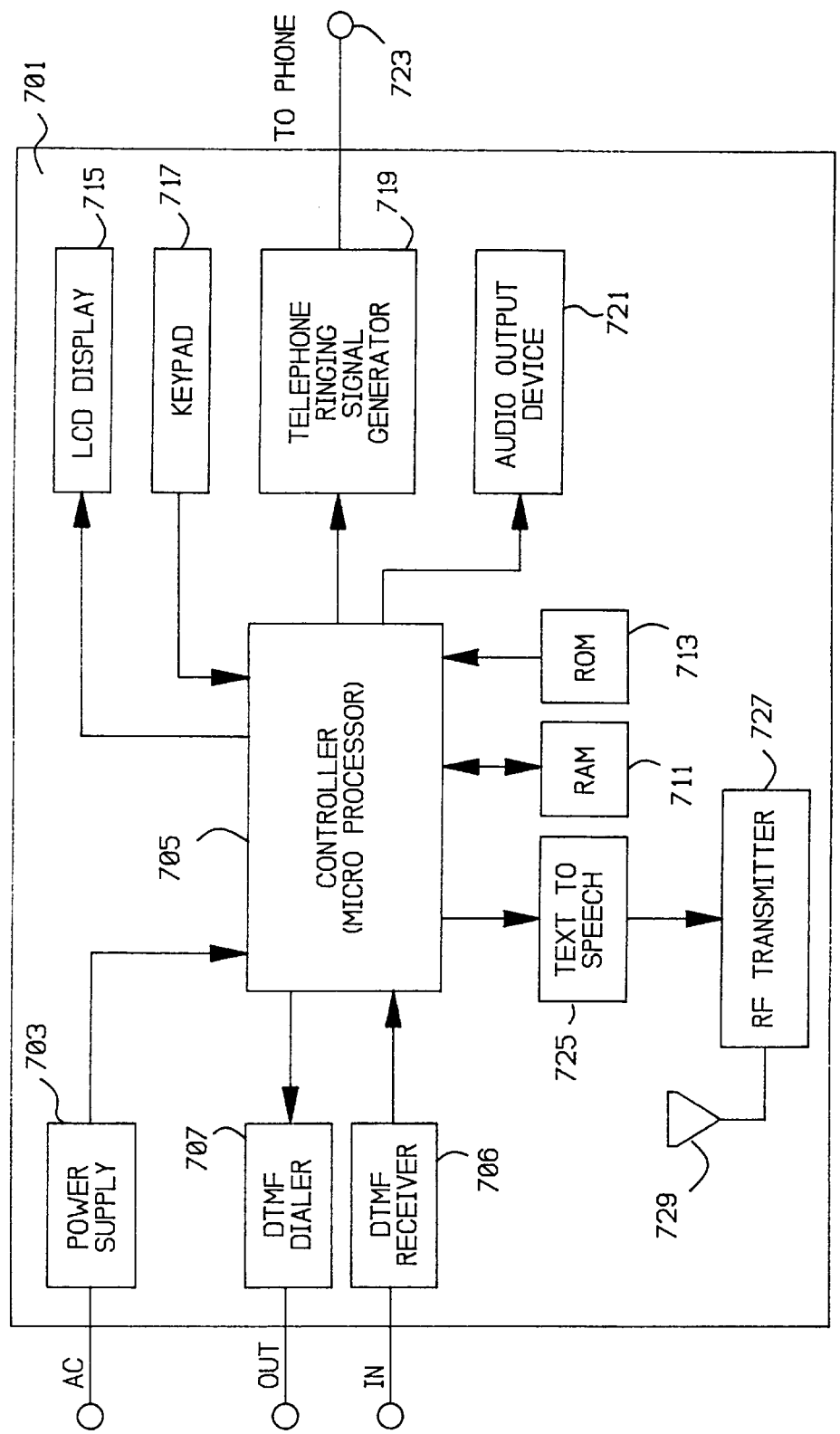
FIG. 18 is a block diagram representation of an alternative monitoring apparatus.

FIG. 18 depicts in block diagram and schematic form a monitoring device which is an alternative to the security data processing system 510 FIGS. 13 through 17. This is a relatively low-cost alternative which does not utilize a computer with a video monitor, but which instead utilizes a controller or microprocessor and an LCD display. As is shown, a monitoring apparatus 701 includes a power supply circuit 703 which receives alternating current as an input and which provides direct current as an output to controller 705 and the other electrical-power consuming components of monitoring apparatus 701. As is shown, controller 705 receives from the receiver units DTMF signals through DTMF receiver 706. Controller 705 produces an output of DTMF signals through DTMF dialer 707. Monitoring unit 701 communicates with the receivers in the manner previously described in order to receive and confirm emergency condition and other signals. Controller 705 contains program instructions in RAM memory 711 and ROM memory 713. In particular, controller 705 includes a data base relating transmitter identification numbers to system-authorized users. In this particular case, monitoring apparatus 701 differs from security data processing system 510 of FIG. 13, insofar as no video display is provided to display photos of system-authorized users or maps of portions of the secured site. Rather, LCD display 715 is utilized to pass textual information from controller 705 to security personnel. The textual information may include the name of the system-authorized user making the request for assistance and the receiver identification and associated room number or other secured site locating information. In order to obtain the immediate attention of security personnel, controller 705 will actuate telephone ringing signal generator 719 to send a ringing signal to a telephone which is secured to monitoring apparatus 701. Additionally, an audio output device 721 may be provided within monitoring apparatus 701 to provide additional confirmation and other signals during interaction between security personnel and monitoring apparatus 701. For this purpose, keypad 717 is provided to allow for numeric and alphanumeric communication of information from security personnel to controller 705. For example, keypad 717 may be utilized by security personnel to acknowledge receipt of an emergency or other signal, causing cessation of the ringing of the telephone associated with monitoring apparatus 701. Since monitoring apparatus 701 is relatively rudimentary in its functionality, it may be provided at relatively low cost, thus enabling relatively small sites, such as small offices or hotels, to utilize the security apparatus without the attendant costs of a data processing system.

Monitoring apparatus 701 includes an additional feature which further reduces the costs associated with installation and operation of the security apparatus 11 of the present invention in small sites which may be understaffed by security and other personnel, and thus not able to have security personnel dedicated to the task of monitoring detected transmissions. As is shown, a text-to-speech module 725 may be provided within monitoring apparatus 701 which receives textual input from controller 705 and which produces a synthesized speech output which is passed to radio frequency transmitter 727 (preferably, a mobile radio transmitter) which broadcasts the synthesized text message via antenna 729 to security personnel equipped with radio frequency receivers tuned to the transmission frequency of radio frequency transmitter 727. In this manner, textual information relating to the nature of a call, the location of the receiver, the identity of the system-authorized individual associated with the transmitter may be broadcast via radio frequency transmitter 727 to one or more security personnel as they patrol the secured site. Upon receipt of the message, security personnel may directly respond to the request by going to the room or room numbers broadcast over the radio frequency transmission in order to provide assistance. This allows the security apparatus 11 of the present invention to be operated in a substantially un-manned manner, thus allowing the security personnel to patrol the secured site until an emergency response is detected. Of course, the speech-to-text module and radio frequency transmitter may be provided to work in combination with the security data processing system 510, so that alarm conditions are immediately broadcast to security personnel without delay, so that dedicated personnel at the security console need not be relied upon solely for immediate reaction to the receipt of emergency condition signals.

Figure 19:
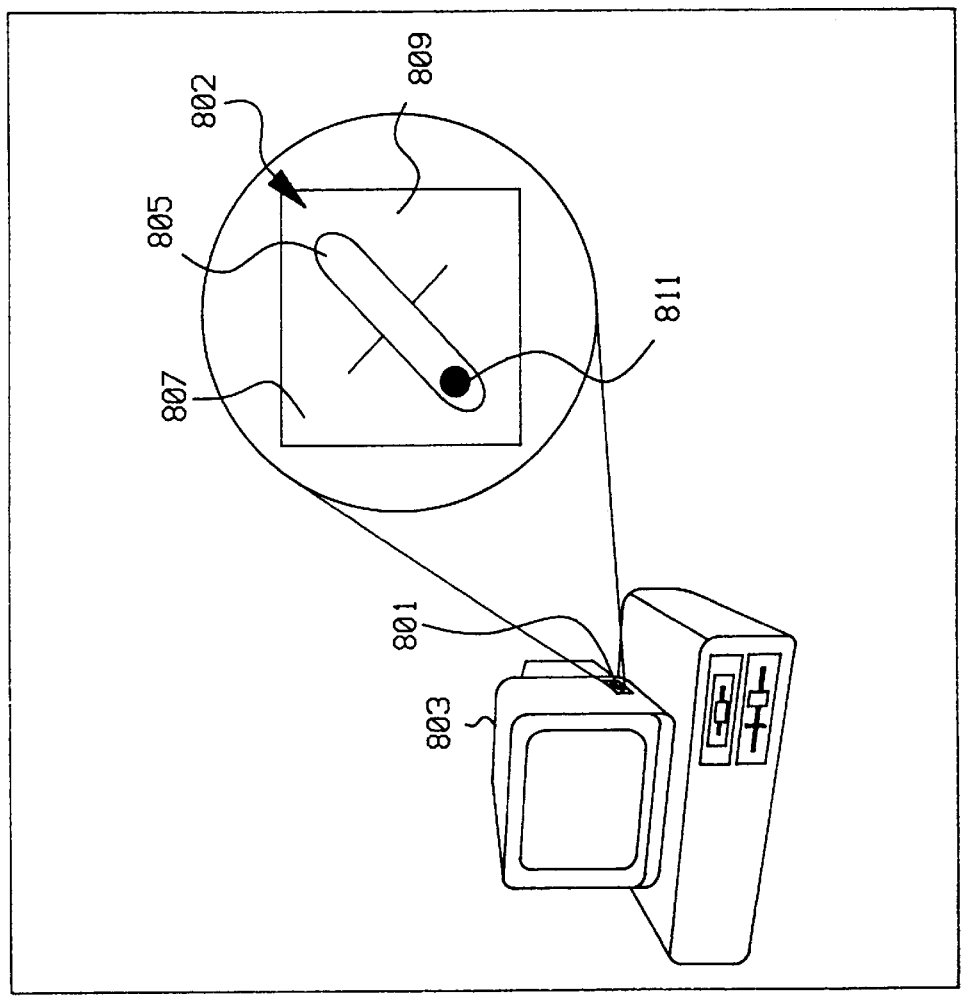

The security apparatus 11 may also be utilized to secure equipment and other valuable items within the secured site. This is especially true since the receivers are laid out throughout the secured site in order to substantially cover all of the site. When utilized to secure equipment, a transmitter may be secured to a piece of equipment which is likely to be tilted when moved about or out of the secured site. FIG. 19 depicts a computer 803 which includes transmitter 801 secured thereto. Within transmitter 801 is provided a position-sensitive switch 802, such as a mercury-filled position switch. Position-sensitive switch 802 includes leads 807, 809, and mercury bead 811 which is contained within capsule 805. If computer 803 is tipped during transport, mercury bead 811 completes the electrical path between leads 807, 809. As will be discussed below, this initiates the transmission of an emergency condition signal from the accompanying transmitter.

Figure 20:
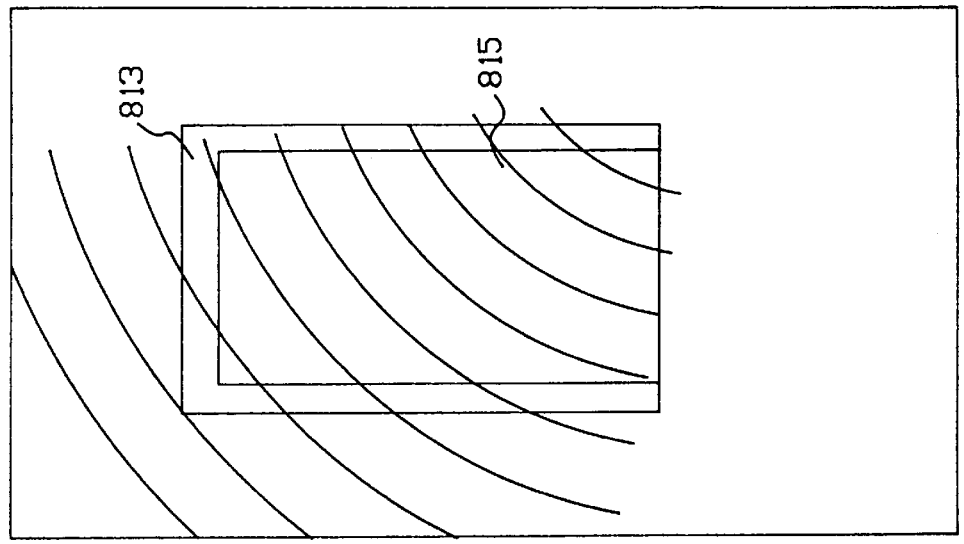
FIGS. 19 through 20 depict features which allow the security apparatus of the present invention to secure equipment within the secured site.

FIG. 20 illustrates an additional equipment protection concept. As is shown, a doorway 813 within a secured site may be equipped with an electromagnetic field generator which generates an electromagnetic field 815 of a particular frequency. In accordance with the present invention, the secured equipment may be equipped with an electrical switch which is triggered by detection of the electromagnetic field of a particular frequency.

Figure 21:
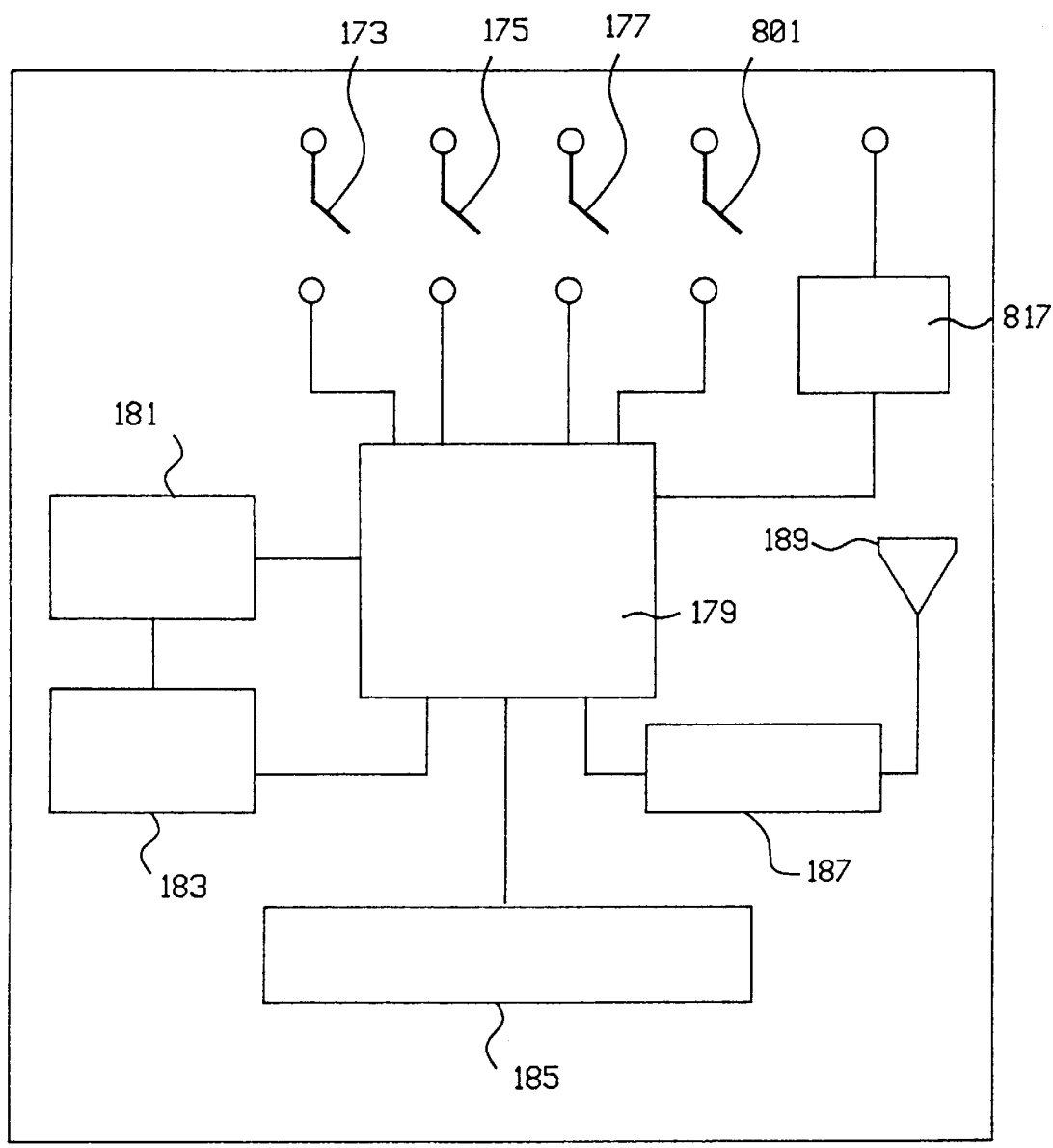

These features will now be discussed with reference to FIG. 21, which is an electrical schematic of transmitter 177 of FIG. 6. As is shown, switches 173, 175, 177, may be provided on the transmitter. Additionally, position-sensitive switch 801 may be provided, as well as electromagnetic field-sensitivity switch 817. As is shown, movement of the equipment carrying the transmitter will cause closure of switch 801. Passage of the equipment through a doorway which is secured by an electromagnetic field will cause closure of electromagnetic field-sensitive switch 817. Either of these events will cause an input pin of controller 179 to be actuated, as is described in connection with FIG. 6, in a manner which generates an emergency condition signal. In this way, equipment can be secured within the secured site. This is especially useful in environments, such as hospitals, wherein extremely expensive but highly portable equipment is maintained and utilized by a relatively large workforce. In accordance with the present invention, the position-sensitive switch is mostly useful with equipment that remains stationary during normal operation. For equipment that is not maintained in a stationary condition during normal operation, the electromagnetic field-sensitive switch is a better candidate.

There are two additional features which may be present in alternative embodiments of the present invention which will now be discussed. One feature is a continuous transmission feature. In this embodiment, a transmitter is programmed to continuously transmit and re-transmit an alarm condition signal for a defined interval. For example, the controller of the transmitter may be programmed to continuously transmit the emergency condition signal every ten seconds for a four-minute interval. This allows the system-authorized user to transmit an alarm condition signal while fleeing from a criminal or a hazardous condition, such as a fire. Security personnel can track the system-authorized user as he/she travels throughout the secured site. This is especially useful in locating persons who may be injured or unconscious, such as, for example, persons who may have been injured during an altercation, or injured through smoke inhalation, or the like. Another feature which may be utilized in alternative embodiments is an alarm-cancel feature. This is a programmable feature which allows the simultaneous depression of multiple buttons on the transmitter to be utilized by security personnel to send a "Cancel" signal to the central monitoring station which indicates to security personnel at the security

What is claimed is:

1. A security apparatus for use in at least one structure, with a plurality of rooms defined therein and with a telephone exchange system located therein, said telephone exchange system having (a) a plurality of telephones distributed throughout said plurality of rooms of said at least one structure and (b) telephone lines linking together said telephone exchange, for providing a security communication system for a plurality of system-authorized individuals located throughout said at least one structure, comprising:

- a plurality of portable transmitters, which are issued to said plurality of system-authorized individuals in accordance with a transmitter issuance schema which identifies particular ones of said plurality of system-authorized individuals of particular transmitters, and which may be utilized to transmit a wireless alarm signal in response to actuation of an alarm condition switch;
- a plurality of receivers which are located in said at least one structure within particular ones of said plurality of rooms in accordance with a receiver distribution schema, each of said plurality of receivers being electrically coupled between a particular one of said plurality of telephones and said telephone lines and which automatically initiate at least one telephone communication within said telephone exchange system in response to detection of a wireless alarm signal;
- a receiver programming apparatus including:
  (a) a data input interface;
  (b) a display;
  (c) a programmable controller; and
  (d) a wireless transmission system;
- wherein said programmable controller includes program instructions for providing an operations menu with a plurality of receiver interactions, which may be viewed at said display;
- wherein said receiver interaction options include at least one of the following:
  (a) a dialog confirmation interaction which causes a particular one of said plurality of receivers to produce a human-perceptible indication that a wireless communication link has been established;
  (b) a unit identification interaction during which said data input interface is utilized to assign a unique identification indicator to a particular one of said plurality of receivers;
  (c) a data interchange interaction during which said data input interface is utilized to initiate data transfer from a particular one of said plurality of receivers over a selected hardware data bus; and
  (d) a telephone number programming interaction during which said data input interface is utilized to define a particular telephone number which is automatically dialed by a particular one of said plurality of receivers when said at least one telephone communication is initiated.

2. A method of providing security for a plurality of system-authorized individuals for use in at least one structure with a plurality of rooms defined therein and with a telephone exchange system located therein said telephone exchange system having (a) a plurality of telephones distributed throughout said plurality of rooms of said at least one structure and (b) telephone lines linking together said telephone exchange, with said plurality of system-authorized individuals being located throughout said at least one structure, comprising the method steps of:

- providing a plurality of portable transmitters which may be utilized to transmit a wireless alarm signal in response to actuation of an alarm condition switch;
- issuing said plurality of portable transmitters to said plurality of system-authorized individuals in accordance with a transmitter issuance schema which identifies particular ones of said plurality of system-authorized individuals to particular transmitters;
- providing a plurality of receivers;
- locating said plurality of receivers in said at least one structure within particular ones of said plurality of rooms in accordance with a receiver distribution schema, each of said plurality of receivers being electrically coupled between a particular one of said plurality of telephones and said telephone lines;
- automatically initiating at least one telephone communication with said telephone exchange system in response to detection of a wireless alarm signal;
- providing a receiver programming apparatus including;
  (a) a data input interface;
  (b) a display;
  (c) a programmable controller; and
  (d) a wireless transmission system;
- wherein said programmable controller includes program instructions for providing an operations menu with a plurality of receiver interaction options, which may be viewed at said display;
- wherein said receiver interaction options include at least one of the following:
  (a) a dialog confirmation interaction which causes a particular one of said plurality of receivers to produce a human-perceptible indication that a wireless communication link has been established;
  (b) a unit identification interaction during which said data input interface is utilized to assign a unique identification indicator to a particular one of said plurality of receivers;
  (c) a data interchange interaction during which said data input interface is utilized to initiate data transfer from a plurality of receivers over a selected hardware data bus; and
  (d) a telephone number programming interaction during which said data input interface is utilized to define a particular telephone number which is automatically dialed by a particular one of said plurality of receivers when said at least one telephone communication is initiated.

* * * * *